(12) United States Patent
Zhang et al.

(10) Patent No.: US 7,133,368 B2
(45) Date of Patent: Nov. 7, 2006

(54) PEER-TO-PEER METHOD OF QUALITY OF SERVICE (QOS) PROBING AND ANALYSIS AND INFRASTRUCTURE EMPLOYING SAME

(75) Inventors: Qian Zhang, Wuhan (CN); Wenwu Zhu, Basking Ridge, NJ (US); XinYan Zhang, Nanjing (CN); YongQiang Xiong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 10/061,462

(22) Filed: Feb. 1, 2002

(65) Prior Publication Data

US 2003/0152034 A1    Aug. 14, 2003

(51) Int. Cl.
*G06F 11/00* (2006.01)
(52) U.S. Cl. .................. 370/249; 370/253
(58) Field of Classification Search ........... 370/249, 370/252, 253
See application file for complete search history.

(56) References Cited

U.S. PATENT DOCUMENTS

| | | | |
|---|---|---|---|
| 5,704,032 A | 12/1997 | Badovinatz et al. | |
| 5,878,032 A * | 3/1999 | Mirek et al. | 370/252 |
| 5,987,376 A | 11/1999 | Olson et al. | |
| 6,003,030 A * | 12/1999 | Kenner et al. | 707/10 |
| 6,385,201 B1 | 5/2002 | Iwata | |
| 6,507,863 B1 | 1/2003 | Novaes | |
| 6,532,237 B1 | 3/2003 | Or et al. | |
| 6,545,979 B1 * | 4/2003 | Poulin | 370/241.1 |
| 6,584,110 B1 * | 6/2003 | Mizuta et al. | 370/401 |
| 6,744,734 B1 | 6/2004 | Iliadis et al. | |
| 6,754,181 B1 * | 6/2004 | Elliott et al. | 370/252 |
| 6,785,237 B1 * | 8/2004 | Sufleta | 370/236 |
| 6,839,752 B1 | 1/2005 | Miller et al. | |
| 2001/0021176 A1 * | 9/2001 | Mimura et al. | 370/235 |
| 2002/0055999 A1 * | 5/2002 | Takeda | 709/224 |
| 2002/0085719 A1 | 7/2002 | Crosbie | |
| 2002/0141343 A1 * | 10/2002 | Bays | 370/235 |

(Continued)

FOREIGN PATENT DOCUMENTS

EP    0800329    10/1997

(Continued)

OTHER PUBLICATIONS

Adam Langley, *The Freenet Protocol*, The Free Network Project, at http://freenet.sourceforge.net/index.php?page=protocol (last visited May 21, 2001).

(Continued)

*Primary Examiner*—Hassan Kizou
*Assistant Examiner*—Anthony Sol
(74) *Attorney, Agent, or Firm*—Lee & Hayes, PLLC

(57) ABSTRACT

A peer-to-peer (P2P) probing/network quality of service (QoS) analysis system utilizes a UDP-based probing tool for determining latency, bandwidth, and packet loss ratio between peers in a network. The probing tool enables network QoS probing between peers that connect through a network address translator. The list of peers to probe is provided by a connection server based on prior probe results and an estimate of the network condition. The list includes those peers which are predicted to have the best QoS with the requesting peer. Once the list is obtained, the requesting peer probes the actual QoS to each peer on the list, and returns these results to the connection server. P2P probing in parallel using a modified packet-pair scheme is utilized. If anomalous results are obtained, a hop-by-hop probing scheme is utilized to determine the QoS of each link. In such a scheme, differential destination measurement is utilized.

50 Claims, 9 Drawing Sheets

U.S. PATENT DOCUMENTS

| | | | |
|---|---|---|---|
| 2003/0048780 A1* | 3/2003 | Phomsopha | 370/389 |
| 2003/0107990 A1* | 6/2003 | Herschleb et al. | 370/229 |
| 2003/0115321 A1* | 6/2003 | Edmison et al. | 709/224 |

FOREIGN PATENT DOCUMENTS

| | | |
|---|---|---|
| WO | WO0001115 | 1/2000 |
| WO | WO0079734 | 12/2000 |
| WO | WO0188734 | 11/2001 |
| WO | WO 01/93064 A1 | 12/2001 |

OTHER PUBLICATIONS

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Lai, Kevin, and Mary Baker, *Measuring Link Bandwidths Using a Deterministic Model of Packet Delay*, at Department of Computer Science at Stanford University, 13 pages.

Rowstron, Antony, and Peter Druschel, *Pastry: Scalable, distributed object location and routing for large-scale peer-to-peer systems*, at Microsoft Research, Ltd., St. George House and Rice University, 20 pages.

Druschel, Peter, and Antony Rowstron, *PAST: A large-scale, persistent peer-to-peer storage utility*, at Rice University and Microsoft Research, 6 pages.

Rowstron, Antony, and Peter Druschel, *Storage management and caching in PAST, a large-scale, persistent peer-to-peer storage utility*, at Microsoft Research, Ltd., St. George House and Rice University, 14 pages.

Rowstron, Antony, Anne-Marie Kermarrec, Peter Druschel, and Miguel Castro, *SCRIBE: The design of a large-scale event notification infrastructure*, at Microsoft Research, Ltd., St. George House and Rice University, 20 pages.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.Ics.mit.edu/chord.

Ellison, C., *SPKI Requirements*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

Kurose et al., "Peer-peer and Application-level Networking", Online!, Sep. 14, 2001, pp. 1-32. Retrieved from the Internet: URL:www-net.cs.umass.edu/cs791n/class2.ppt.

Postel, "User Datagram Protocol UDP—RFC 768," IETF RFC, Aug. 28, 1980, 3 pgs.

Postel, "RFC 791: Internet Protocol", IETF Request for Comments, Sep. 1981, pp. 1-49.

Lai, Kevin and Mary Baker, *Measuring Bandwidth*, at Department of Computer Science at Stanford University, 11 pages.

Banerjee, Suman and Agrawala, Ashok K., *Estimating Available Capacity of a Network Connection*, at Department of Computer Science at University of Maryland, 10 pages.

Dan Kegel; NAT and Peer-to-peer networking; Jul. 17, 1999; 4 pp.

Allen B. Downey; Clink: a tool for estimating Internet link characteristics; Jul. 19, 1999; 5 pp.

Van Jacobson; pathchar—a tool to infer characteristics of Internet paths; Apr. 21, 1997; 21 pp.

Bruce A . Mah; pchar: A Tool for Measuring Internet Path Characteristics; Feb. 12, 2005; 3 pp.

Vern Paxson; Measurements and Analysis of End-to-End Internet Dynamics; Apr. 1997; 389 pp.

Adams, et al., "The Use of End-to-End Multicast Measurements for Characterizing Internet Network Behavior," Feb. 2000, 10 Pages.

Dykes, et al., "An Empirical Evaluation of Client-Side Server Selection Algorithms," 2000, 10 Pages.

Stemm, et al., "A Network Measurement Architecture for Adaptive Applications," Mar. 2000, 10.

Francis, et al., "An Architecture for a Global Internet Host Distance Estimation Service," Mar. 1999, 17 Pages.

Guyton, et al., "Locating Nearby Copies of Replicated Internet Servers," Feb. 1995, 18 Pages.

"Internet Performance Measurement and Analysis Project; User's Guide (version 10)," 1998, 7 Pages.

Myers, et al., "Performance Characteristics of Mirror Servers on the Internet," Mar. 1999, 9 Pages.

Paxson, et al., "An Architecture for Large-Scale Internet Measurement," Aug. 1998, 9 Pages.

\* cited by examiner

[Xbox(NIP:Port)    Number of peers (PeeredXbox (NIP:Port) RTT BW PL)
        (PeeredXbox (NIP:Port) RTT BW PL)
        ...]

[Xbox(NIP:Port)    Number of peers (PeeredXbox (NIP:Port) RTT BW PL)
           (IPaddr    RTT BW  PL)
           (IPaddr    RTT BW  PL)...)
        ...]

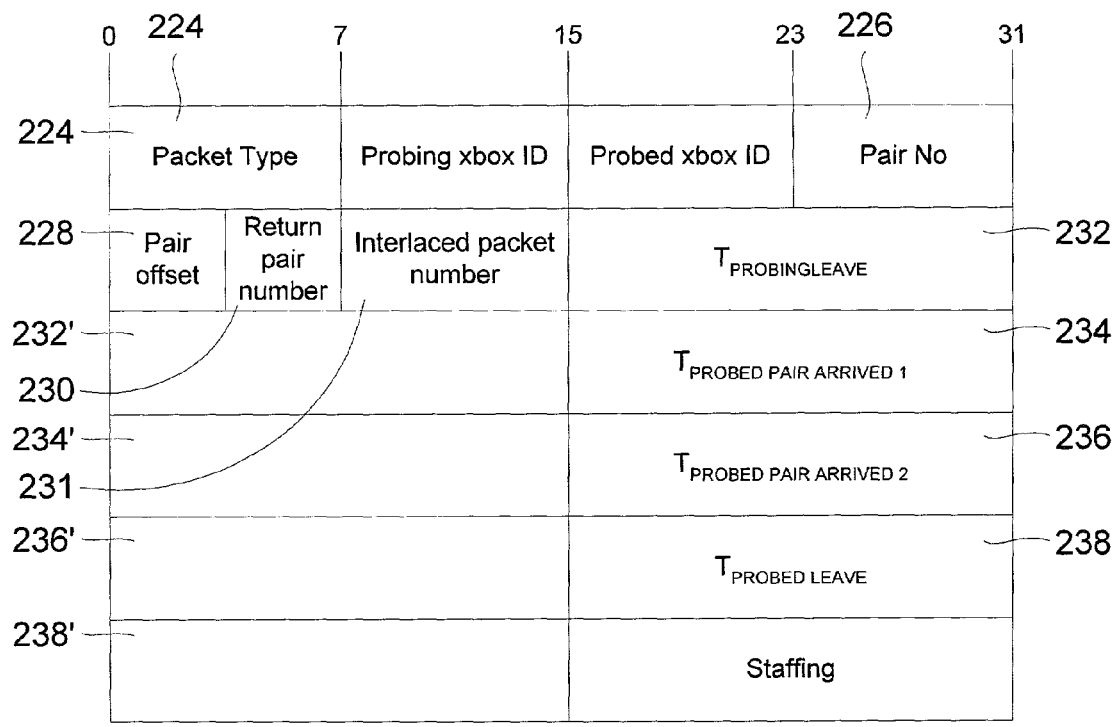
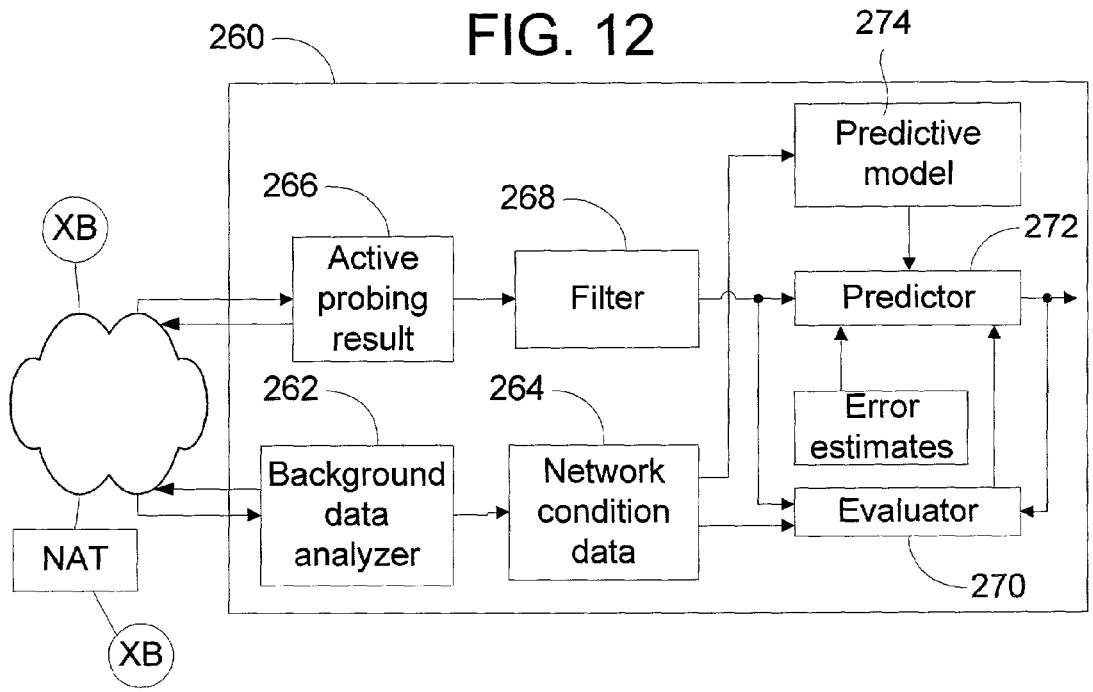

PEER-TO-PEER METHOD OF QUALITY OF SERVICE (QOS) PROBING AND ANALYSIS AND INFRASTRUCTURE EMPLOYING SAME

FIELD OF THE INVENTION

This invention relates generally to quality of service (QoS) probing and network analysis systems and methods and, more particularly, to peer-to-peer QoS probing and analysis systems and methods for on-line gaming applications.

BACKGROUND OF THE INVENTION

As the number of users and traffic volume continue to grow on the Internet, it becomes essential that a set of network performance metrics and measurement methodologies should be available that allow both the users and network service providers to have an accurate, common understanding of the performance and reliability of given Internet paths. On the users' side, once equipped with a set of network performance metrics and measurement tools, it will become much easier to have an accurate knowledge of what kind of service is available via different connections. With this information the users will be able to compare the relative performance of the various network service providers and peers. A user can then intelligently make a connection decision that will provide the best network performance and on-line experience. Similarly, knowledge from network performance measurements will also enable the network providers themselves to intelligently deploy more powerful switches to boost network capacity. Likewise, content-based service providers can use this information to optimally deploy and manage their service servers.

That is, this performance information may be used by many Internet services and systems to enable the creation of robust overlays for peer-to-peer systems or application-level multicast trees, by users to enable the selection of a server among multiple server mirrors, and by service providers to determine the placement of server replicas to improve the performance of content distribution networks. In an on-line peer-to-peer (P2P) gaming environment, this information may be used to determine where to deploy additional connection servers, and by content providers to deploy additional game servers. Despite many proposals on building an Internet measurement infrastructure from the research community, however, it is hard for such an infrastructure to be fully deployed and operational in the near future, due to both the scale and the complexity of the Internet.

In an on-line P2P gaming environment this scale and complexity is apparent. Specifically, there are now or will be in the near future several million game consoles or boxes deployed worldwide. One such game box, sold by the assignee of the instant application, is the Microsoft XBox. However, while there are a large number of game boxes deployed, there are only a relatively small number of connection servers deployed that will facilitate the location of and connection to multi-player gaming servers and to other peers running the desired game.

The connection decision, i.e. to which of the available peers and peers serving as game servers should a player connect, requires that the network performance or quality of service (QoS) between the player and the game server or peer be known. It is known that there are several types of QoS parameters, such as end-to-end delay, bandwidth, packet loss ratio, etc. All these metrics have tradeoffs, so the whole picture should be taken into consideration rather than focusing on one. Indeed, the tradeoffs may depend on the requirement of the particular gaming application running over the network.

For gaming applications, latency is the most important parameter for QoS selection. With the deployment of a broadband network, more and more games are utilizing multimedia technology to improve their representation ability. As a result, the network performance monitoring system should also pay attention to bandwidth and other QoS components. However, current low level network performance monitoring techniques are inadequate because some internet service providers (ISPs) use traffic filtering techniques within their networks, for example by blocking Internet Control Message Protocol (ICMP) echo packets, etc. Measurements using such packets (e.g., ping, traceroute, etc.) can only achieve a rather low accuracy, and are therefore unacceptable.

To further complicate the issue, many game boxes are deployed onto the network behind a Network Address Translator (NAT). Therefore, to determine the network QoS performance between those peers, a probing connection between those peers must be established. Unfortunately, NAT characteristics vary widely in their ability and willingness to allow such connections. However, the on-line gaming user will not tolerate a long delay while different probing techniques are tried to determine the network performance to those peers. Any long delay before a connection is made to play the game or otherwise run the application desired will detract from the user experience. Additionally, with potentially millions of peers available on the network, the sheer volume of probing traffic that could be generated as each peer tries to determine the network performance to the other peers might very well introduce network delays. Further, the amount of probing data that would result from such probes could quickly fill up the available memory of the game boxes, further detracting from the gaming performance.

BRIEF SUMMARY OF THE INVENTION

In view of the above, the instant invention presents a new and improved system and method of managing latency between peers in a network. In an on-line P2P gaming environment, the system and method of the instant invention provides a better gaming experience by managing the network latency and allowing a user to establish gaming sessions with peers and/or game servers that provide the best network performance. Preferably, the system and method of the instant invention provides a user with a number of peers or game servers that meet acceptable performance criteria. The number of choices provided and the time in which this number is determined are also managed in the system and method of the instant invention.

Recognizing that many peers may connect to the network from behind a Network Address Translator (NAT), the infrastructure of the present invention provides a number of servers, termed connection servers (CS) herein, to which a peer initiates and maintains an open connection so that it can have an external IP address. While it is envisioned that there will be many millions of peers in the network, only a relatively few CS, will be necessary to service those peers. In this infrastructure the CSs have the knowledge of the connected peers, and provide those peers with information relating to which of the connected peers and game servers (GSs) are available with an acceptable quality of service (QoS).

In order to provide this functionality, the system and method of the present invention utilize what may be thought of as two phases of operation, to wit a QoS probing and monitoring phase, and a QoS analysis and prediction phase. In the first phase, a UDP-based tool is utilized for probing the QoS parameters required to make the connection decisions within the network. This UDP-based tool enables the QoS probing of peers which are either connected to the network from behind a NAT or directly. In a gaming environment, network latency is the most important QoS parameter, although other parameters such as end-to-end delay, bandwidth, packet loss ratio, etc. may also be calculated. Recognizing that many Internet service providers (ISPs) use traffic filtering techniques within their networks (e.g., by blocking ICMP echo packets, etc.), the tool of the present invention preferably provides application-level measurements.

In this first phase of operation, the system and method of the present invention measures QoS in the network in four stages. In the first stage, the login stage, a connection is established between the peer and the connection server. The latency between the peer and its NAT, and that between the peer and the CS are both measured by the peer and stored in the CS. In the second stage, the data analysis and pre-selection stage, the peer is provided with a list of potential candidates that meet the peer's requirements. This list is generated by the CS from an analysis of prior and current data stored in the CS from prior probes conducted by peers. In the third stage, the probe and measurement stage, the peer will probe, preferably in parallel, the peers or servers returned to it in the second stage. Finally, in the fourth stage, the log and feedback stage, the QoS measurements obtained by the peer are returned to the CS for use in the second phase (the QoS analysis and prediction phase). In each of these four stages, protocols for communication between the peer and the CS, between the CSs, and between the peers are defined, along with a unified packet format for use therewith.

In the probe and measurement stage, the UDP-based probing tool (referred to as uProbe herein) is used for peer-to-peer probing. The tool preferably utilizes a modified packet-pair probing scheme. This allows the determination of the end-to-end latency, an estimation of the bottleneck bandwidth, and the packet loss ratio. In the log and feedback stage a statistical model is then selected that represents the probed QoS results, and they are returned to the CS for use therein in the QoS analysis and prediction phase.

When the peer faces anomaly probing results, e.g. extremely large round trip times (RTT), destination unreachable, etc., the peer will then perform a hop-by-hop diagnosis for each peer for which such results are returned. This hop-by-hop analysis utilizes a packet train to probe the hop-by-hop path characteristics. Differential destination measurement (DDM) is used to allow the inference of the link characteristics from the cooperation among the packet train packets. Filtering and statistical definition are used to estimate the link characteristic before the results are sent to the CS for use therein in the QoS analysis and prediction phase.

In the QoS analysis and prediction phase the CS utilizes the QoS information collected by and sent to it from the peers in the first phase. The CS groups related information from various peers, obtains discriminative features which can characterize the critical path QoS parameters, and extracts useful temporal information from the data. This information is then combined to obtain the statistical model of the network. This information is used once a request is received from a peer to return a list of suitable peers for connection thereto. Different statistical models may be used based on various parameters, and the models are updated once the peer performs the QoS probing in the first phase.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 10 is a data structure diagram illustrating a probing packet format used during peer-to-peer probing in an embodiment of the present invention;

FIG. 12 is a simplified functional block diagram illustrating the off-line data analysis and on-line data prediction performed by the connection server in an embodiment of the present invention.

DETAILED DESCRIPTION OF THE INVENTION

Figure 1:
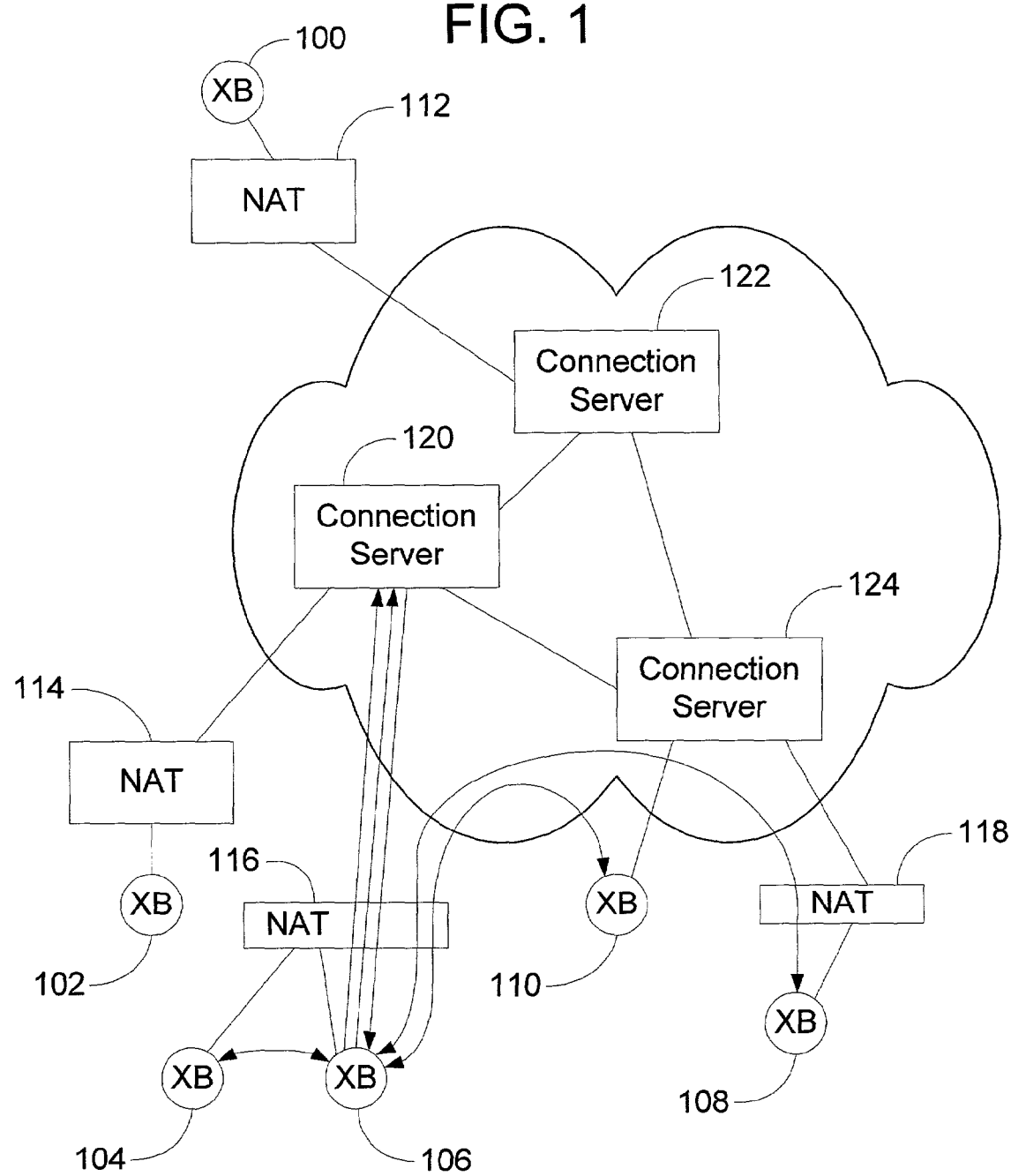
FIG. 1 is a simplified network block diagram illustrating a peer-to-peer infrastructure in which the system and methods of the present invention find particular relevance.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, video game boxes, and the like. The invention may also be practiced in distributed computing environments where tasks are performed by remote processing devices that are linked through a communications network. In a distributed computing environment, program modules may be located in both local and remote memory storage devices.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In an on-line peer-to-peer (P2P) gaming environment, such as that deployed to operate with the Microsoft XBox and illustrated in FIG. 1, there are or soon will be several million game boxes 100–110 deployed and available for connection to one another and to game servers via this gaming network. However, since many of these game boxes 100–108 are likely to connect through a Network Address Translator (NAT) 112–118, a server is needed to establish and maintain an external IP address for the individual game boxes. These connections servers (CSs) 120–124 will maintain an open connection through the NATs 112–118 to the game boxes 100–108 with which they are in contact. In this way, peering and probing relationships may be established between game boxes on the network. However, in a preferred embodiment of the present invention there will be relatively few, e.g. 3–5, CSs deployed to service the game boxes. Therefore, to find the appropriate game-candidates in this large number of game boxes within a reasonable time, the system of the present invention, therefore, needs to focus both on QoS probing and monitoring, and on QoS analysis and prediction simultaneously to meet the needs of the users of the system.

In the first phase of operation of the system of the present invention, referred to herein as the QoS probing and monitoring phase, it is recognized that each game box (peer) 100–108 may be behind a NAT 112–118. As such, in order for the system of the present invention to be able to probe the QoS parameters between two peers (e.g. between peer 106 and peer 108), a connection between those peers must be established. While methods are known that open peer-to-peer UDP connections, it is hard to build a TCP connection for two peers that both connect through a NAT. As such, a preferred embodiment of the present invention utilizes a UDP-based tool resident at the peer for probing the QoS parameters within the network of the present invention.

It is known that there are several types of QoS parameters, such as end-to-end delay, bandwidth, packet loss ratio, etc. Recognizing that all such metrics have tradeoffs, the system of the present invention looks at the whole picture rather than focusing on one particular parameter on which to base the connection decisions. Indeed, the system of the present invention preferably trades off these parameters based on the requirement of the application that is running over the network. For gaming applications, latency is typically the most important parameter for QoS selection. However, with the deployment of a broadband network, more and more games are utilizing multimedia technology to improve its representation ability. In recognition of this, an embodiment of the present invention also considers bandwidth and other QoS components as will be discussed more fully below.

Typical QoS monitoring techniques (e.g., ping, traceroute) use low level packets as the probing packets. However, some ISPs today use traffic filtering techniques within their networks that may, for example, block ICMP echo packets, etc. As a result, measurements using such packets can only achieve a rather low accuracy. Recognizing this, the system of the present invention instead attempts to measure the actual performance of the networked applications. Application-level measurements are needed for a clear view of overall application performance, which cannot easily be synthesized from low level data.

While application-level measurements give the best overall view of application performance over a network, such probing can result in excessive network overhead. Since the system of the present invention needs to determine the appropriate subset of peers on the network that meets a peer's requirements within a limited time, parallel probing is a logical candidate for the system of the present invention. However, the overhead caused by parallel probing must be taken into account so that the probing tool of the present invention does not interfere with the vary parameter it is attempting to measure.

As such, the corresponding overhead for a given peer can be analyzed roughly as follows. Assume that N equals the number of peers which are to be probed by a peer to determine the best candidate with which to establish a peering relationship. In one embodiment of the present invention, this number N is set to 50. Also assume that O equals the number of outgoing probes for each peer. This number affects the accuracy of probe result, so it should be given a suitable limitation. In preferred embodiments of the present invention this number varies from 30 to 50. The letter P equals the length of the outgoing probe packets. Packets with different sizes, e.g. 100 bytes, 200 bytes, 500 bytes, 1200 bytes, etc., are used in embodiments of the system of the present invention for probing bottleneck bandwidth. The letter I equals the interval of two continuous outgoing probes for the same peer. More accurate probing results are achieved when the interval between successive probing packets satisfies the Poisson process. In one embodiment, for simplicity, I is set to 100 ms to obtain the rough overhead analysis. Another element of the overhead is S, the loss rate for the outgoing packets. When a packet is lost in the network, the system of the present invention sends it again, which increases the load on the network. For this analysis, two values, 0 or 0.001, are used. The value of T, the time used in the peer-selection stage, is restricted in a preferred embodiment to be less than or equal to 3 or 5 seconds. Finally, the latency between two peers in the gaming environment is assumed to be less than or equal to 100 ms or 200 ms or 500 ms, depending on different game genres. From this information an estimate for the bytes to be sent, and thus the added overhead, in the selection stage is illustrated in Table 1.

TABLE 1

| N | O | S | P | Bytes to be sent | Bps needed |
|---|---|---|---|---|---|
| 50 | 50 | 0.001 | 100 | 250250 | 50.05K |
| 50 | 30 | 0 | 500 | 750000 | 150K |

When the entire procedure of this QoS probing and monitoring phase is examined, it is noted that there is likely to be some additional load added to the network due to such functions as IPSec negotiation, bi-direction connection establishment, etc. Therefore, the estimates illustrated in Table 1 are recognized to be simply estimates.

Before discussing the details of the QoS probing and monitoring phase, it is worth noting that there are also challenges presented in the QoS analysis and prediction phase of operation. Particularly, since there are a large number of peers deployed in the network, each peer may have its own probing results. How much data should be stored and what type of information should be stored become challenge issues. To get the probing results in only, e.g., 5 seconds, the system of the present invention makes use of historical information as a reference. It also uses an estimation technique discussed below to predict the QoS parameters. The key issues in this phase of the system, therefore, includes how to analyze the historical data to get the statistical information promptly, and what type of estimation technique should be used for QoS parameters prediction.

Having introduced briefly each of the two phases of operation in the system of the present invention, attention is now focused in more detail on the QoS probing and monitoring phase of operation, and the tools employed therein. To make the following discussion as precise as possible, some terminology and a naming convention is now defined. A peer, e.g. an XBox, behind a NAT will have a local IP address and a local port. When it maintains an outgoing connection, it will also have a NAT IP address and NAT port. To refer to the local address and local port of the peer, the following discussion will use the convention XB1.LIP and XB1.LP. To refer to the NAT address and port of that peer, the designation XB1.NIP and XB1.NP will be used. Sometimes the discussion will simply talk about the external IP address and external port of a peer. By this it is meant the IP address to which a computer directly connected to the Internet (not going through a NAT) would be able to address a packet to reach the peer. For a peer directly connected to the Internet, this means the XB1.LIP and XB1.LP. For a peer that is going through a NAT, this means the XB1.NIP and XB1.NP. To simplify matters, when the discussion turns to an external IP address and external port of a peer, XB1.XIP and XB1.XP will be used. Also in this discussion, CS stands for a connection server, and GS for a game server, which may be a peer that indicates that it want to act as a game server. Further, it is assumed that a CS, or any other server will never be behind a NAT. As such, there is no local versus external addressing potential confusion. When talking about the IP address and port of a server, the discussion will refer to, e.g., CS1.IP and CS1.P.

In addition to the naming convention adopted above, the following discussion will also utilize some QoS terminology as follows. L1 will refer to the latency between a peer and its NAT. L2 will refer to the latency between a peer and its CS. L3 will refer to the latency between a peer and the destination peer. L4 will refer to the latency between a peer and its GS. B1 will refer to the bandwidth between a peer and the destination peer.

Having introduced the naming convention, the discussion will now focus on the system and method for measuring the QoS in the exemplary gaming framework illustrated in FIG. 1. As introduced above, this is the QoS probing and monitoring phase of the system of the present invention. This phase may best be understood as being divided into 4 stages of operation. These stages include a login stage, a data analysis and pre-selection stage, a probe and measurement stage, and a log and feedback stage. Each stage will be discussed in detail below as they apply to the application of the system of the present invention to the gaming network for the Microsoft XBox, recognizing that the system and method of the present invention may be applied with equal force to other peer-to-peer networks as well.

Figure 2:
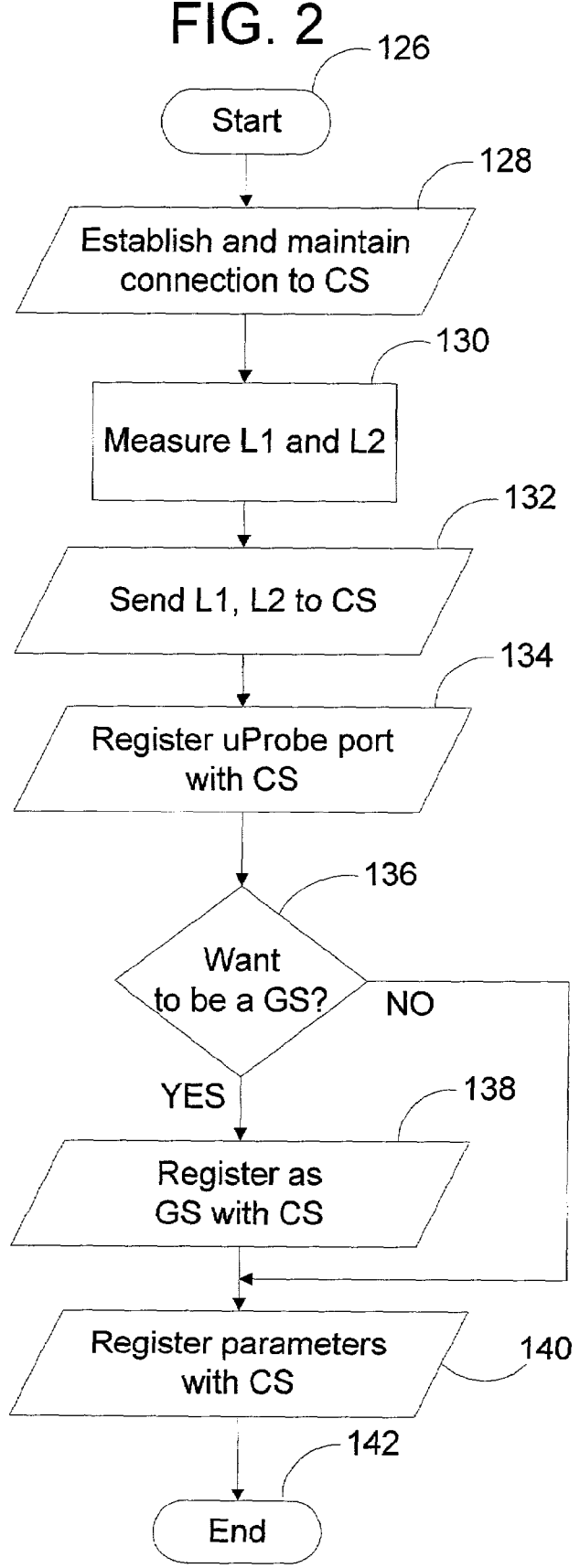
FIG. 2 is a simplified flow diagram illustrating a login stage of operation in accordance with an embodiment of the present invention.

As illustrated in FIG. 2 with continuing reference to FIG. 1, once the login stage has begun 126, the Peer 106 finds a CS 120 in the region and establishes 128 the connection for the periodic "Keep-Alive" packets that the CS 120 will provide. In this login stage, the Peer 106 measures L1 and L2 by any conventional technique at step 130. These values are then sent 132 to the CS 120 and stored therein. In the meantime, if 136 the Peer 106 wants to act as a Game Server, the Peer 106 will tell 138 its CS 120 that it wants to act as a Game Server for the "Hub and Spokes" game type. In one embodiment, a UDP port is registered 134 for the use for the of measurement process discussed below in the third stage. As will be discussed more fully below, the Peer 106 may also register 140 other parameters with the CS 120 before this stage ends 142.

Figure 3:
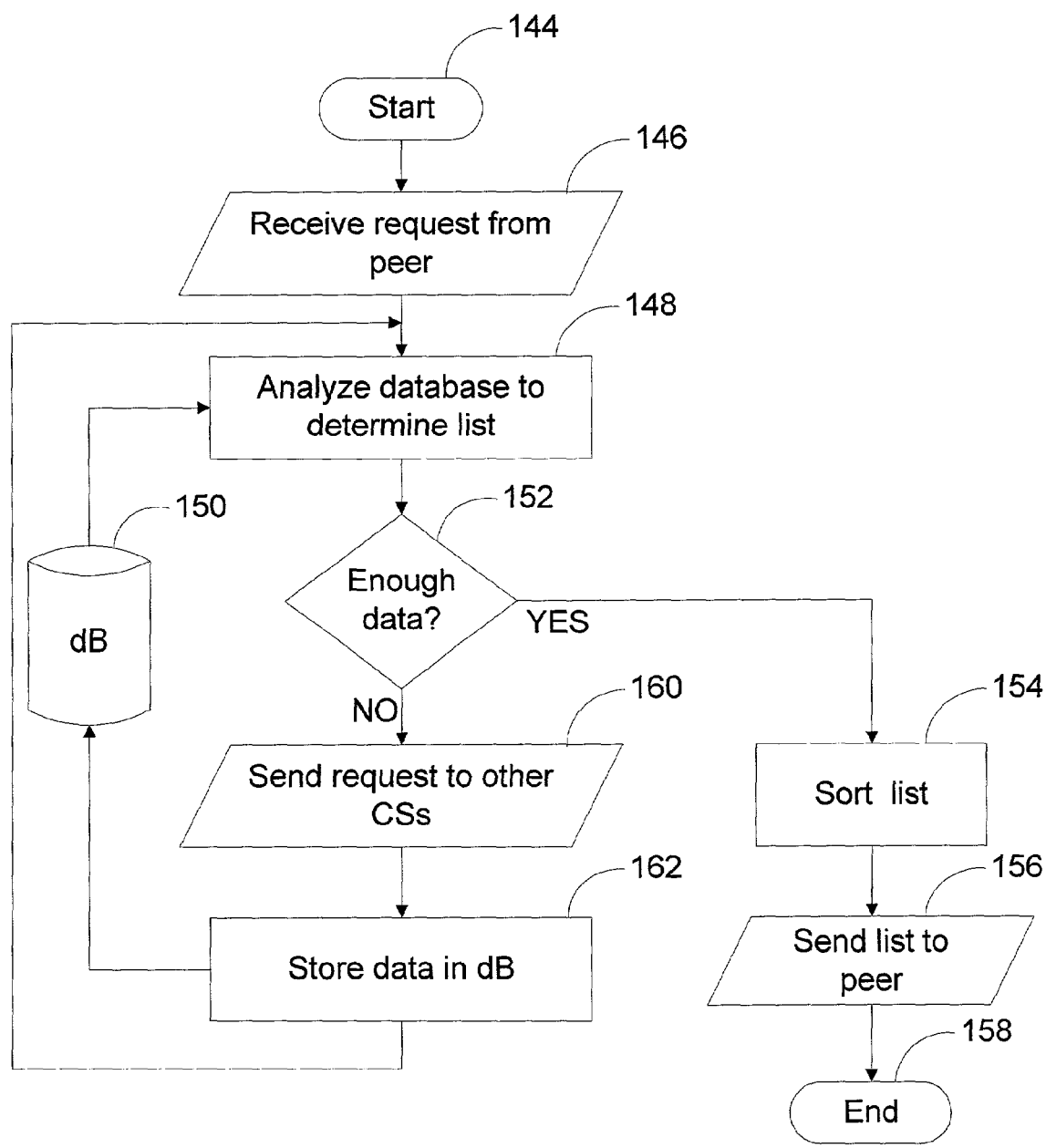
FIG. 3 is a simplified flow diagram illustrating a data analysis and pre-selection stage of operation in accordance with an embodiment of the present invention.

In the data analysis and pre-selection stage 144 illustrated in simplified flow diagrammatic form in FIG. 3, the CS 120 receives 146 a request from a Peer 106 for a list of Peers and/or GSs to probe. In one embodiment, the Peer 106 sends a XnetRetrieveXBoxList command to its CS 120. The purpose of the probes is to allow the Peer 106 to find the fastest or closest game session or game server for it to join. Initially, the CS 120 will analyze 148 the previous and current QoS data that it has received from that or other Peers or other network probe entities stored in its database 150. If 152 there is not enough data to form a complete list, the CS 120 will send 160 a request to the other CSs 122, 124 for additional data, which is then stored 162 in the database 150. From the data in the database 150, the CS 120 determines a suitable Peer list (GS list is a special Peer set in which each item claims in the login stage that it wants to act as "Hub" for "Hub and Spoke" game type). The CS 120 will then make and sort 154 a corresponding list to be sent 156 to the requesting Peer 106 before this stage ends 158.

The list that the CS 120 derives and returns to the requesting Peer 106 preferably meets a number of requirements. First, the number of peers included in the list should be restricted with a parameter. The parameter is the maximum number of outgoing probes. It may be a static number, such as 1000, or a number assigned by the Peer 106 or CS 120. It should not be very large. Second, all the Peers in the list should be active currently. Third, all of the Peers included in the list must permit more incoming probes. Considering the Peer performance and denial of service (DoS) attacks, a peer should not permit unlimited incoming probes. Therefore, each Peer will register its maximum and current number of incoming probes with its CS during step 140 of FIG. 2. Using this information, the CS can choose to include only those "hungry" Peers. Fourth, the latency between the source Peer and the Peer in the list should be expected to be less than the parameter assigned by the source Peer depending on different game genre and user experience. The CS will sort 154 the latency, and will reply 156 to the source Peer with the best results. In one embodiment, some items included on the list will be marked as unqualified. Finally, for the GS list, only those Peers that claimed in the login stage that they want to act game servers will be included.

Figure 4:
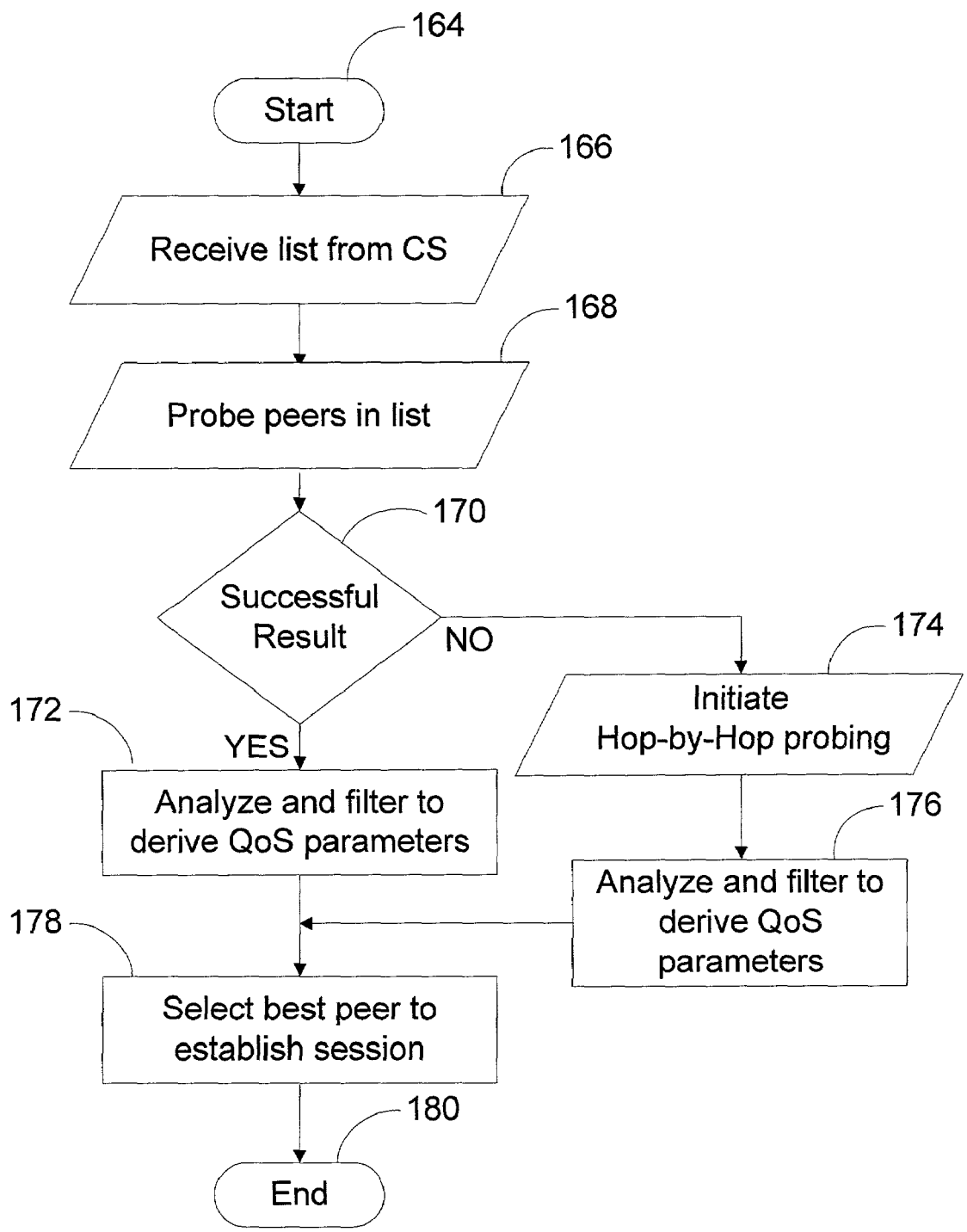
FIG. 4 is a simplified flow diagram illustrating a probe and measurement stage of operation in accordance with an embodiment of the present invention.

In the probe and measurement stage illustrated in FIG. 4, which is started 164 after the Peer 106 receives 166 the list from the CS 120, the Peer 106 will perform a large number of network probes in parallel within a predetermined period of time beginning at step 168. Preferably, this time is set to less than 3–5 seconds to prevent undue delay from detracting from the user experience. These probes should not adversely affect the normal network performance, so the system of the present invention performs these probes in such a way as to allow the analysis of multiple QoS parameters through one probe request. If the initial peer-to-peer probing, which is preferably performed in parallel, is successful 170, the results are analyzed and filtered 172 to derive the required QoS parameters. If 170 the results are not successful, the uProbe will initiate 174 a hop-by-hop probing process. The results from this process are then analyzed and filtered 176 to derive the QoS parameters. This information is used by the Peer to select 178 the best Peer with which to establish a session. This stage then ends 180.

To combine with the online gaming framework more tightly and improve the probe performance, the system of the present invention uses an UDP-based, NAT-friendly measurement tool, referred to herein as uProbe. In order to create a connection to the measurement tool of the Peer, the Peer registers its UDP port to its CS in the login stage as discussed above. In an alternative embodiment, a static well-known port is defined just for the use of the QoS measurement. In addition to performing the probing function, the uProbe measurement tool in each Peer will also respond immediately 186 to each incoming probe from another Peer when received 184 so that the QoS can be measured more accurately as will be discussed below with respect to FIG. 5. This is ensured by raising the process priority of this QoS process in the Peer system.

Figure 5:
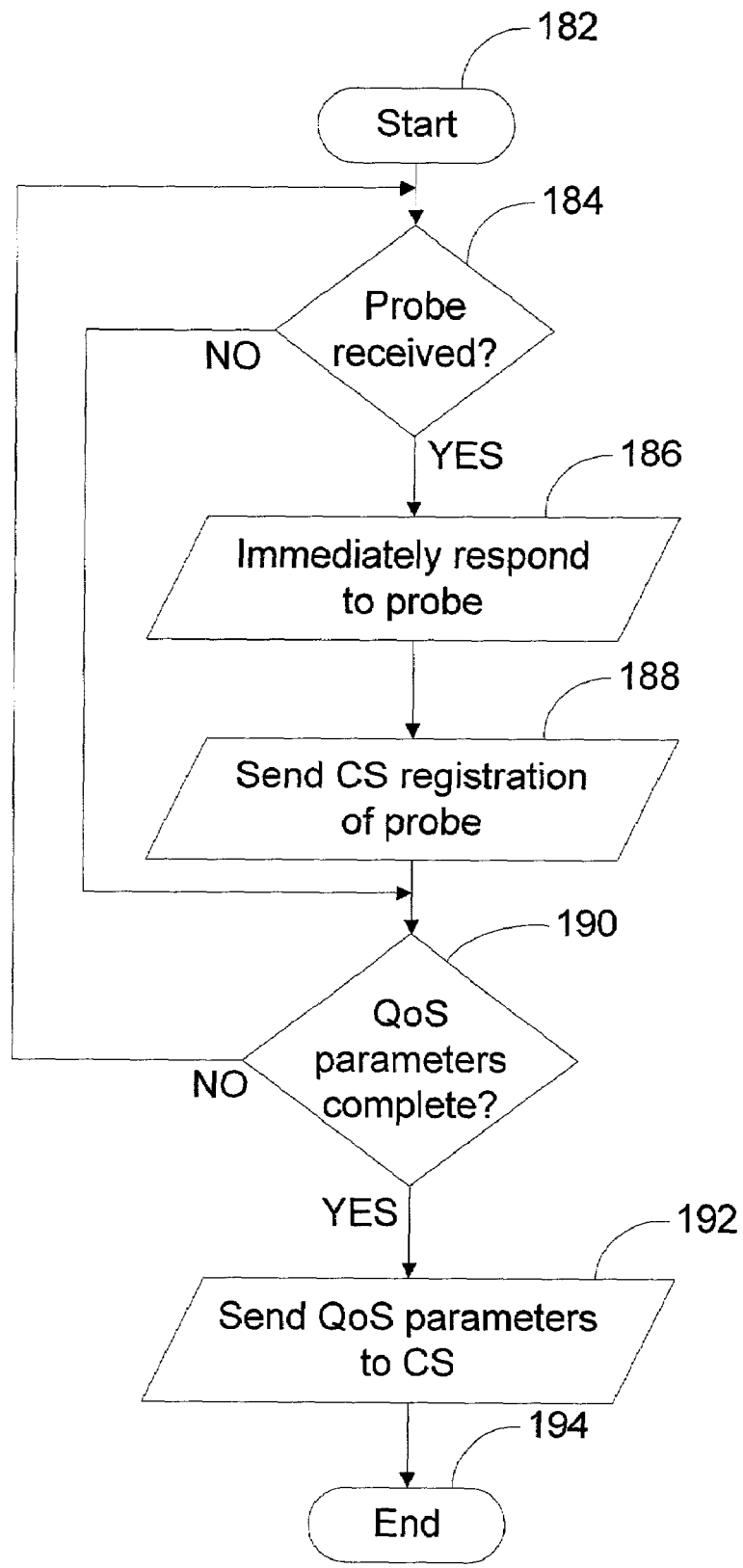
FIG. 5 is a simplified flow diagram illustrating a log and feedback stage of operation in accordance with an embodiment of the present invention

After probing, the Peer will deliver the QoS measurement results to its CS in the log and feedback stage illustrated in FIG. 5. Once started 182, if 190 the QoS parameters are complete, the Peer will send 192 these to its CS. These measurement results will be important source data for the CS as will be discussed hereinbelow. Additionally, when 184 a peer receives an incoming probe packet from another Peer, it will send 188 an XnetRegisterIncomingProbes command to its CS. This feedback information is used by the CS to limit the number of probes that will be sent to that Peer when this number reaches its limitation. This is accomplished by simply not including that Peer in future lists that are sent in response to the XnetRetrieveXBoxList command discussed above.

Figures 6, 7, 8:
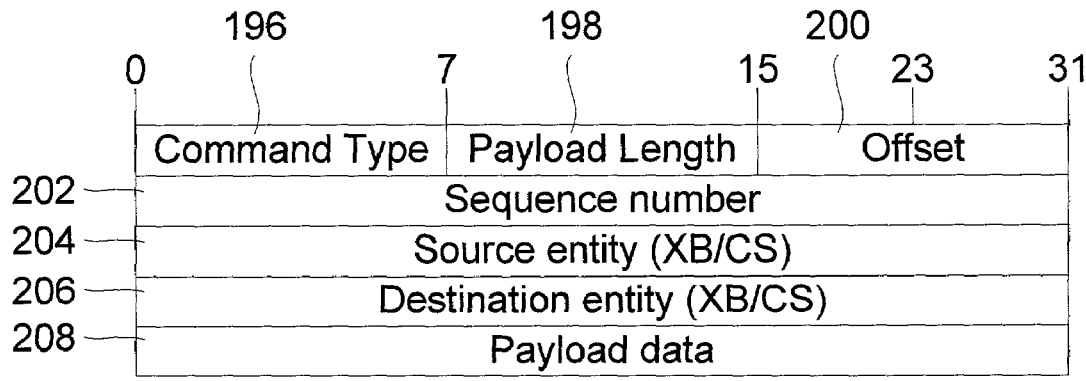
FIG. 6 is a data structure diagram illustrating a unified packet format employed during the operating stages of FIGS. 2–5.
FIG. 7 is a simplified message format diagram illustrating a message format used to report successful probing results in an embodiment of the present invention.
FIG. 8 is a simplified message format diagram illustrating a message format used to report hop-by-hop probing results in an embodiment of the present invention.

In each of the four stages just discussed, communication between the Peer and the CS, between the CS and other CSs, and between different Peers utilize interaction protocols. For the sake of convenience and efficiency, each of these protocols utilize a unified packet format as illustrated in FIG. 6. In this packet, the Command Type field 196 contains an enumerable variable that may have the following types in one embodiment: CT_KeepAlive; CT_XboxList; CT_uProbePort; CT_IncomingProbe; CT_DataForCS; CTQosProbe; and so on. The Payload Length field 198 designates the length of the payload in 32 bits (4 bytes). The Offset field 200 indicates the offset in the payload when one packet cannot carry the entire command. The Sequence Number filed 202 is used to meet specific goals such as avoiding duplication, acknowledgement, and sequence. The Source/Destination Entity fields 204, 206 contains the identifier of the source/destination entity of the packet. Finally, the Payload Data field 208 contains any payload data that may be required for the specific type of packet, as will be discussed below. All these protocols are "Request-Response" UDP-based protocols. As such, the entity that receives the request packet will reply to the request with the same kind of packet.

The protocol for communication between the CS 120 and the Peer 106, primarily needs to keep the connection to the Peer 106 alive, especially where the Peer 106 connects through a NAT 116. Therefore, the CT_KeetAlive packet needs to be sent and received periodically. Since this packet is used primarily to keep the connection to the Peer alive, the payload 208 of the packet may be zero. This protocol is also used for the request and reply for the pre-selection list discussed above. As discussed, the Peer 106 will ask for the list from the CS 120 when it wants to start a game session. The CT_XBoxList packet may be used for this function. The protocol between the Peer 106 and its CS 120 is also used to register the UDP port for QoS measurement tool. In the login stage, the Peer 106 will report this UDP port to CS 120 with the CT_uProbePort packet. The Peer 106 will also register the number of incoming probes that it will allow for use by the CS 120 in generating the Peer list. When the number of current incoming probes changes, the Peer 106 will report this change to its CS 120 with the CT_IncomingProbe packet. Finally, once the Peer 106 has completed its probes, it delivers the QoS results to its CS 120 by using the CT_DataForCS packet.

The protocol between any two CSs is used primarily to update the QoS database. This protocol also includes the request and reply for the pre-selection list when another CS can is contacted to supply additional peers for the peer list. As discussed above, this CS to CS communication is accomplished when the local CS does not have information on Peers that meet the request of one of its Peers, and the CS needs to request additional information from other CSs to complete the Peer list. This protocol makes use of two kinds of packets, the CT_DataForCS and the CT_XBoxList.

The Peer to Peer protocol is implemented in the uProbe tool discussed more fully below to fetch the QoS of the link between the two Peers in communication. This is accomplished, generally, by sending and receiving CT_QosProbe packets by the uProbe tool.

In accomplishing the QoS probing of the present invention, it is noted that such probing will either be successful, i.e. responses are received to the probing request, or it will be unsuccessful, i.e. no or extremely slow responses are received to the probing request. To comprehensively analyze these successful probing results and the anomaly (unsuccessful) probing results, two separate probing schemes are utilized by the uProbe tool of the present invention. One is for peer-to-peer probing and the other is for hop-by-hop probing. The following discussion will explain how the system of the present invention probes the QoS metrics in a network, with specific attention focusing on one embodiment for an on line gaming framework, given a large range of gaming candidates.

The process for such QoS probing is divided into four stages as illustrated in FIG. 4 and introduced briefly above. In Stage 1, peer-to-peer probing in parallel 168, the Peer will generate a large number of network probes in parallel within less than the predetermined time, e.g. 5 seconds. As discussed above, these probes should not affect the normal network performance. The uProbe tool in the probed Peers will respond to each incoming probe immediately to enhance the accuracy of the measurement of the QoS. In Stage 2, successful probing result feedback 172, the Peer will select a proper statistical model to represent the probed QoS results. The Peer will then deliver them to its CS. As mentioned above, this information will be an important source of data for the further data analysis that will be performed in the CS.

In Stage 3 hop-by-hop probing 174 is performed for any anomaly results that are detected in Stage 1. Facing anomaly probing results, e.g., extremely large RTT, destination unreachable, etc., the Peer will perform a detailed hop-by-hop diagnosis for each of them. In this process, discussed in detail below, the weighted QoS metric will be measured between the Peer and each intermediate node between the source and the destination Peer. Stage 4, the anomaly probing result feedback stage 176, is similar to Stage 2. That is, after the hop-by-hop probing has been performed, the Peer will select a proper statistical model to represent the probed QoS results. They are then delivered to the CS and will serve as important source data for the further data analysis and candidate selection performed in the CS.

The interaction message format for transporting the successful probing results to the CS is illustrated in FIG. 7. This interaction message includes the ID for the current Peer. This address comprises the NAT:IP address (4 bytes) and the port number (2 bytes). The message also includes an indication of the number of peers that were successfully probed (1 byte). QoS metric information for each probed Peer is also included. This information includes the ID for the probed Peer (6 byte), the RTT (2 bytes), the bottleneck bandwidth (2 bytes), and the packet loss ratio (1 byte).

The interaction message format for transporting the anomaly probing results to the CS is illustrated in FIG. 8. This interaction message includes the ID for the current Peer, which comprises the NAT:IP address (4 bytes) and the port number (2 bytes). The message also includes an indication of the number of peers that were successfully probed by the hop-by-hop method (1 byte). QoS metric information for each probed Peer is also included. This information includes the ID for the probed Peers (6 bytes), the RTT (2 bytes), the bottleneck bandwidth (2 bytes), and the packet loss ratio (1 byte).

Figure 9:
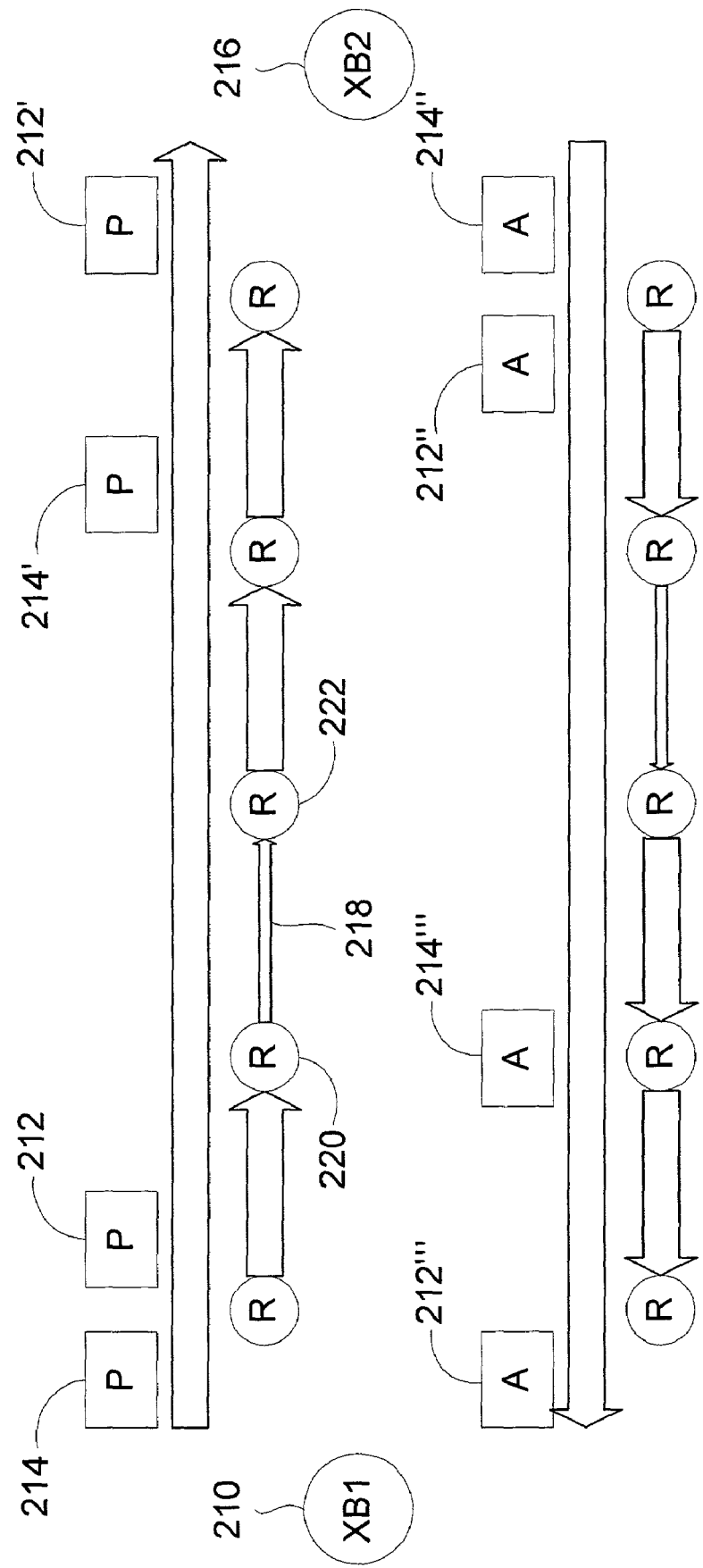
FIG. 9 is a simplified communication flow diagram illustrating a modified packet pair probing scheme employed in an embodiment of the present invention.

With an understanding of the general principles of the peer-to-peer probing provided by the system and method of the present invention, a more detailed discussion of the probing mechanism and analysis algorithms used by the peer-to-peer QoS probing scheme of the present invention is now undertaken. As discussed above, one goal for the peer-to-peer QoS probing presented herein is to measure as many parameters as possible using one probing tool, uProbe, without injecting too much traffic onto the public network. For end-to-end latency and bottleneck bandwidth estimation, a modified packet-pair scheme is used as illustrated in FIG. 9. This packet pair probing works as follows. The source Peer 210 sends two packets 212, 214 back-to-back to the destination Peer 216. The rate at which the packets pass the bottleneck 218 of the path between routers 220, 222 will determine the spacing of the packets 212', 214' after the bottleneck 218. The packets 212', 214' will approximately keep this new spacing after the bottleneck 218, which can be calculated as:

$$t = \frac{s_2}{B_{bottleneck}}, \quad (1)$$

where $s_2$ is the size of the second probing packet, and $B_{bottleneck}$ is the bottleneck bandwidth.

It is known that asymmetric routes are common in the backbone networks. However, with the help of the probing Peer 210 and the probed Peer 216 the system of the present invention can measure the bottleneck bandwidth for the forward and return paths separately. Considering the application level measurement requirement discussed above, two UDP probing packets 212, 214 with the same size of PSize are sent out, back-to-back, at the probing Peer side 210. Each probing packet 212, 214 contains a timestamp that indicates the moment this packet leaves the application layer ($T_{ProbingLeave}$). On the probed Peer side 216, upon receiving probing packet pair 212', 214', the bottleneck bandwidth of the forward path can be calculated as:

$$B_{bottleneck-forward} = \frac{PSize}{T_{ProbedPairArrived1} - T_{ProbedPairArrived2}}, \quad (2)$$

where $T_{ProbedPairArrived1}$ and $T_{ProbedPairArrived2}$ are the arrival timestamps of the first 212' and second 214' packets on the probed Peer side 216, respectively.

The probed Peer 216 adds these arrival timestamps in the probing packets 212", 214" and re-sends them to the probing Peer 210 back-to-back at the probed Peer side 216. A timestamp that indicates the moment these packets leave the probed Peer 216 ($T_{ProbedLeave}$) is recorded in each out-going probing packet 212", 214". Then, on the probing Peer side 210, upon receiving this returned probing packet pair 212''', 214''', bottleneck bandwidth of the return path can be calculated as:

$$B_{bottleneck-return} = \frac{PSize}{T_{ProbingPairArrived1} - T_{ProbingPairArrived2}}, \quad (3)$$

where $T_{ProbingPairArrived1}$ and $T_{ProbingPairArrived2}$ are the arrival timestamps of the first 212''' and second 214''' packets on the probing Peer side 210, respectively.

Having these six timestamps, two instances of the end-to-end delay (Round Trip Time—RTT) can be calculated as:

$$RTT_1 = (T_{ProbingPairArrived1} - T_{ProbingLeave}) - (T_{ProbedLeave} - T_{ProbedPairArrived1}), \quad (4)$$

$$RTT_2 = (T_{ProbingPairArrived2} - T_{ProbingLeave}) - (T_{ProbedLeave} - T_{ProbedPairArrived2}). \quad (5)$$

In the probing scheme of the present invention, based on the number of packets transmitted from the probing Peer and the number of packets received on the probed Peer, the packet loss ratio in the forward path can be calculated. Likewise, based on the number of packets transmitted from the probed Peer and the number of packets received on the probing Peer, the packet loss ratio in the return path can be calculated. There are two different quantities for packet loss characterization. One of the most often used quantities is the average packet loss, or unconditional loss probability (ulp). To calculate this, denote the Boolean variable $l_n$ as 1 if a packet is lost and 0 otherwise. The average loss is thus equal to the expected value of $l_n$: ulp=E[$l_n$]. To capture the correlation between successive packet losses, the conditional loss probability (clp) can be used to consider the conditional probability that a packet is lost given that the previous packet is lost, i.e., clp=P[$l_{n+1}$=1|$l_n$=1]. Note that if the number of transmitted packets is quite small, e.g., smaller than 20, it will not make much sense to calculate the packet loss ratio.

In an embodiment of the peer-to-peer QoS probing algorithm of the present invention, consideration is given to the size and the number of probing packet-pairs in both directions. Before implementing the mathematical model of the probing scheme, consideration is given to the physical capabilities of the hardware and software so that the mathematical model may be correctly mapped to a physical model. Before such mapping, an understanding of the characteristics of all the physical components, such as hardware, software, and operating systems is explored. The major issue involved is timing. The $T_{ProbedPairArrived1} - T_{ProbedPairArrived2}$ in Equations (2) and (3) above is a factor of the clock resolution and other timing issues introduced by the hardware, device drivers, and context switches. It is known that, for Intel®-based CPUs, the resolution is about 0.8 microseconds. With the characteristics of the system clock resolution in mind, the packet size in this embodiment is chosen as 200 Bytes. If operating on the system kernel level with a higher clock resolution, a smaller packet size may be chosen so as to generate more probing packets in the lower access connection embodiment.

To determine the number of probing packet pairs, suppose N is the number of Peers to be probed, e.g. 50 in one embodiment. Also suppose P is the length of the outgoing probe packet, which is selected as 200 Bytes in one embodiment, and T is the time used in the QoS probing stage. Having the information of the uplink and downlink access bandwidth of the probing Peer (UpBW$_{probing}$/DownBW$_{probing}$) and the probed Peer (UpBW$_{probed}$/DownBW$_{probed}$), the number of probing packet pairs in both directions (NPair$_{forward}$, NPair$_{return}$) can be determined as follows:

$$NPair_{forward} = \max\left(NPair_{max}, \frac{UpBW_{probing} \times T}{N \times P \times 2}\right), \quad (6)$$

$$NPair_{return} = \max\left(NPair_{max}, \frac{DownBW_{probing} \times T}{N \times P \times 2}\right), \quad (7)$$

where NPair$_{max}$ is the maximum number of probing pairs needed to be delivered for accurate QoS measurement, which is set as 20 in one embodiment.

In order not to give the probed Peers too much overhead, the following constrains should be satisfied for each probed Peer:

$$(NPair_{forward,i} \times P \times 2) \leq DownBW_{probed,i} \times T \times 5\%, \text{ and} \quad (8)$$

$$(NPair_{return,i} \times P \times 2) \leq UPBW_{probed,i} \times T \times 5\%, \quad (9)$$

where $NPair_{return} = \sum_{i=1}^{N} NPair_{return,i}$, and $\quad (10)$ $$NPair_{forward} = \sum_{i=1}^{N} NPair_{forward,i}. \quad (11)$$

It is also important to determine the interval between the probing packet pairs. When a peer is probing a large number of peers in parallel, the sending-out packets and the bouncing-back packets may self-synchronize and interference with each other. The uProbe tool of the present invention uses a Poisson distribution to describe the interval between each packet-pair of a certain peer, recognizing that different peers may have different arrival rates.

When the access bandwidth is large enough, there is no need to send the probing packet-pairs one-by-one without interval. This time, the interval which follows a Poisson process is decided. This is done by computing the minimum bandwidth, UpBW$_{min}$ that is required for sending out enough probing packets (Npair$_{max}$) as $$\frac{UpBW_{min} \times T}{N \times P \times 2} \geq NPair_{max}, \text{ i.e.,} \quad (12)$$

$$UpBW_{min} \geq \frac{NPair_{max} \times N \times P \times 2}{T}.$$

E.g., in one embodiment, NPair$_{max}$ is set as 20, N as 50, P as 200 Byte, T as 5 s, then the UpBW$_{min}$ should be larger than 640 kb/s. Next, the sending interval between each pair is calculated as $$Interval = \frac{UpBW_{probing}}{UpBW_{min}} * x, \quad (13)$$

where x is the time for sending a packet-pair when the bandwidth is UPBW$_{min}$. In this embodiment, x can be calculated as $$x = \frac{P \times 2}{UpBW_{min}}. \quad (14)$$

Next, the Poisson process is generated using the interval information, including the basic parameters $$\lambda = \frac{1}{Interval}, \quad (15)$$

random numbers, $U_1, \ldots, U_n$, uniformly distributed between 0 and 1, and $E_i$ which follows Poisson process by $$E_i = \frac{-\log(U_i)}{\lambda} \quad (16)$$

In detail, the steps include generating $E_1$ and waiting $E_1$, performing probing measurement (sending first packet-pair), and calculating the measurement duration $M_1$. Next, generating $E_2$ and waiting $E_2-M_1$, performing probing measurement (sending next packet-pair), and calculate the measurement duration $M_2$, and so on.

The format of the probing packet itself is illustrated FIG. 10. In this format the PacketType field 224 indicates the packet types, which can be, e.g., a data packet, a forward probing packet, a return probing packet, etc. The PairNo field 226 indicates the number of the probing packet pair, and the PairOffset field 228 indicates the offset of the current packet in this probing packet pair. The Return Pair Number field 230 indicates the number of pairs needed to be sent back on the probed Peer side upon receiving a forward packet pair. The Interlaced Packet Number field 231 indicates the number of packets that interlaced between the forward probing packet pair. It is set by the receivers. Finally, the $T_{ProbingLeave}$, 232, 232', $T_{ProbedPairArrived1}$, 234, 234' $T_{ProbedPairArrived2}$, 236, 236' and $T_{ProbedLeave}$ 238, 238' fields store the corresponding timestamps as discussed above.

As may now be apparent, there are several key characteristics of the probing scheme of the present invention. One such characteristic is that the present invention derives as many QoS metrics as possible using limited probing packets. Any packet in the forward path that can be received in the probed Peer, will result in that probed Peer generating a packet pair for return path bandwidth estimation and round trip time measurement. This mechanism also provides low overhead to the probed Peer since it must only add the timestamp. As such, it needs only a small buffer to store the first packet of the probing pair.

Once a successful probing result has been achieved as discussed above, the system of the present invention performs a statistical analysis of the probing results. Once it is understood what network metrics exist and how to measure them, it must be decided how to represent the results. Care is required for choosing a suitable statistic for different network metrics. In particular, statistics that make assumptions about the process generating the data being summarized should be avoided. Based on the probing algorithm and the characteristics of different network metrics, different kinds of statistical techniques are utilized for end-to-end delay and bottleneck bandwidth measurements.

For the statistical definition for RTT, "median" is used to represent the measured RTT. Median is a robust statistic that estimates the central tendency of a dataset without regard to knowing a priori distribution. The median can be thought of as the center point of a set of data, or the 50th percentile. If data points are sorted in ascending order, half of all data points are above the median and half are below the median. The median is determined by the middle data point for an odd number of data points, and by the average of the two middle data points for an even number of data points. For most purposes, the median (50th percentile) is a good choice, since it is not affected a great deal by a few outlier data values.

The system of the present invention also includes filtering and a statistical definition for bottleneck bandwidth. That is, it is known that the main problem with the basic packet pair algorithm is how to filter out the noise caused by time compressed and extended packets. Therefore, at a first instance the system of the present invention will filter out those packet pairs which were interlaced with other packets. For those concatenated pairs, the system uses a kernel density estimator to overcome the time compression and extension problems. That is, the system defines a kernel function K(t) with the property $$\int_{-\infty}^{+\infty} K(t)dt = 1. \tag{17}$$

Then the density at any point $x$ is defined as $$\frac{1}{n}\sum_{i=1}^{n} K\left(\frac{x-x_i}{h}\right), \tag{18}$$

where $h$ is the kernel width, $n$ is the number of points within $h$ of $x$, and $x_i$ is the $i$th point. The kernel function we use is $$y = \begin{cases} 1+x & x \le 0 \\ 1-x & x > 0 \end{cases}. \tag{19}$$

This function has the desirable properties that it gives greater weight to samples closer to the point at which the system wants to estimate density, and it is simple and fast to compute. The kernel density estimator algorithm is known to be statistically valid, and most importantly, it makes no assumptions about the distribution it operates on, and therefore should be just as accurate as other data sets.

In equation (18), a larger value of the kernel width gives a more accurate result of density, but is also computationally expensive. In one embodiment of this implementation, the kernel width is set as the whole range of the bottleneck bandwidth, i.e., $x_{max}-x_{min}$. In that case, the density at any point x can be simplified as $$\sum_{i=1}^{n} |x-x_i|. \tag{20}$$

If there are no concatenated pairs, the accuracy of the QoS probing will be decreased. One way to preclude this is to extend the probing period so as to increase the probability of occurring concatenated pairs. Another way is to estimate the "bottleneck spacing interval" based on the downlink access bandwidth, the number of packets in the middle of a packet pair, and the separating time interval between the two packets in this pair. A linear regression method is used for estimating the bottleneck bandwidth in one embodiment. After the estimated bottleneck bandwidth is calculated, the kernel density estimator algorithm is preferably still used to calculate the final bottleneck bandwidth.

While the previous discussion focused on the peer-to-peer QoS probing scheme and the analysis of the successful probing results, attention is now directed to the hop-by-hop probing and results analysis schemes employed for anomaly results introduced above. As discussed, such anomaly results may be in the form, e.g., of extremely long RTTs, destination unreachable, etc. The following discussion will first describe the probing procedure, then present the probing algorithm in detail, and finally discuss the derivation of the results obtained using a statistical analysis approach.

Existing solutions for hop-by-hop QoS probing, such as pathchar, pchar, clink, etc., are built from a deterministic model that considers only one measurement packet to infer all link characteristics, especially bandwidths, along a path.

As a result, these techniques rely on routers handling ICMP packets consistently, and on timely delivery of acknowledgements. However, there are several shortcomings with these solutions. First, it is known that ICMP can be used as a form of denial of service attack on a router. To reduce this risk many routers place a very low priority on the creation of ICMP packets to avoid overloading the router's CPU. This means that there will be a latency caused by the time taken by a router to generate the ICMP error message. Second, some routers handle packets of different sizes differently. This also introduces errors into the slope calculation used to calculate bandwidth. Additionally, these techniques use significant amounts of network bandwidth to perform their measurements, and can be slow enough to become impractical for some of the applications.

Figure 11:
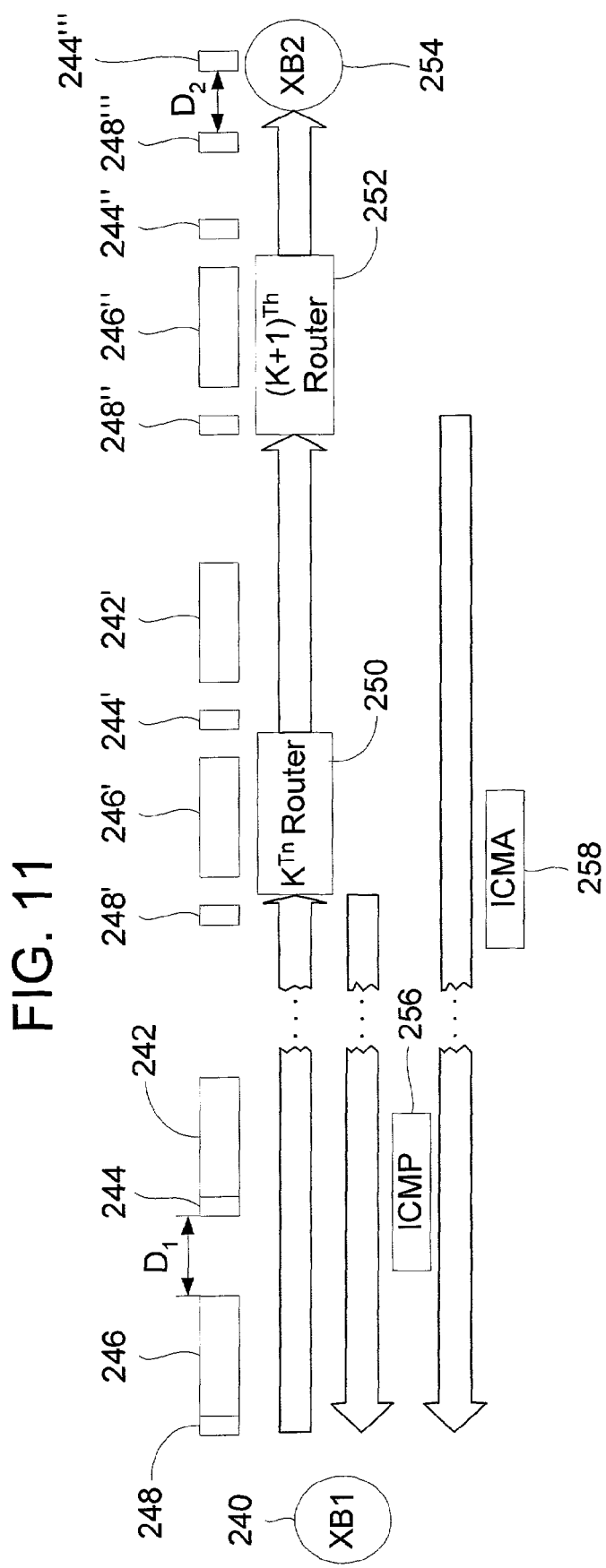
FIG. 11 is a simplified communication flow diagram illustrating a hop-by-hop packet train probing scheme employed in an embodiment of the present invention.

The hop-by-hop probing scheme of the present invention aims to obtain the link capacity measurements while avoiding at least some of the limiting factors that are present in single packet techniques. The basic measurement technique is illustrated in FIG. 11. As may be seen, a probing peer 240 generates a packet train containing four packets 242–248. Unlike traditional packet train techniques, these four packets 242–248 are composed of two packet pairs. There is a short delay, delay1, between those two pairs. The two packets in each packet pair are sent out back-to-back. The first packet 248 is a small packet with its packet size varying from 40 bytes. The second packet 246 is much larger than the first one, and takes MTU (1500 bytes) as its packet size in one embodiment.

The large packet 242 in the first pair is set to expire (using the incremental TTL from 1 to destination) at the link being measured (the $k^{th}$ router 250). The large packet 246 in the second pair is set to expire (using the incremental TTL from 2 to destination) at the next hop (the $(k+1)^{th}$ router 252) after the link being measured 250. The small packets 244, 248 in both pairs will be delivered to the destination, the probed Peer 254. During the transmission, the small packets 244, 248 will keep "catching up" to those two large packets 242, 246. This is because the transmission delay of the larger packets is larger than that of the smaller one. If the first larger packet 242 expires at the link being measured 250, the following smaller packet 244 will be "released" from the delays caused by being behind the bigger packets. Meanwhile, two ICMP time-exceed error messages 256, 258 will return to the probing host side 240. The latency experienced by the smaller packet will change if the link on which the larger packets are set to expire changes.

It is noted that, although the ICMP time-exceeded packets 256, 258 from intermediate nodes 250, 252 are utilized for measurement, the scheme of the present invention uses these packets 256, 258 only for identifying routers 250, 252 and does not rely on their timely delivery. Additionally, even if the intermediate routers delay the ICMP error messages and handle the different-sized packets differently, it will not affect the results in direction-2 measurement because only the time-difference is used in the bandwidth estimation.

Through this hop-by-hop probing of the present invention, the characteristics of each link can be measured. As just discussed, the system of the invention captures link-specific characteristics by causing queuing of packets at a particular link. For each link, the probing host sends the packet train with four packets. The two large packets with a time-to-live (TTL) set to expire at that and the consecutive links are followed by two very small packets that will queue continuously behind the large packets until the link where the large packets expire. The link characteristics may then be inferred from the relation between the $2^{nd}$, the $3^{rd}$, and the $4^{th}$ packets in a probing train using differential destination measurement (DDM) discussed below.

In DDM the system of the present invention sends the largest possible non-fragmented packet, packet ($k_1-1$) 242, with an IP Time-to-Live (TTL) field of i. This packet 242 is immediately followed by the smallest possible packet, packet $k_1$ 244. The smaller packet 244 almost always has a lower transmission delay than the larger packet's transmission delay on the next link. This causes the smaller packet (packet $k_1$ 244) to queue continuously after the larger packet (packet $k_1-1$ 242). After a short time interval, delay1, another largest possible non-fragmented packet, packet $k_2-1$ 246, is sent with an IP Time-to-Live (TTL) field of i+1. This is immediately followed by the smallest possible packet, packet $k_2$ 248. Similarly, this also causes the smaller packet (packet $k_2$ 248) to queue continuously after the larger packet (packet $k_2-1$ 246). The TTL for packet $k_1-1$ 242 will cause it to be dropped at link i 250. This will allow the packet k1 244 to continue without queuing to the destination 254. Similarly, the TTL for packet $k_2-1$ 246 will cause it to be dropped at link i+1 252 allowing the packet $k_2$ 248 to continue without queuing to the destination 254. At the destination 254, the probed Peer 254 will receive packet k1 244 and packet k2 248 consecutively, with a time interval of delay2. Note that in this way, packet $k_1$ 244 will not be queued at link i 250 while the packet $k_2$ will still be queued at link i 250 due to the continued existence of the large packet $k_2-1$ 246 at this link. The system of the present invention then infers the characteristic of link i by utilizing this difference.

Using a multi-packet delay equation, such as that discussed in Lai and Baker, Measuring Link Bandwidths Using a Deterministic Model of Packet Delay, ACM Sigcomm 2000, the teachings and disclosure of which is hereby incorporated in its entirety by reference thereto, it can be inferred that the time packet $k_1$ takes to arrive at the destination link $_n$ (with variables defined in Table 2) is:

$$t_n^{k_1} = t_0^{k_1} + \sum_{i=0}^{n-1} \left( \frac{s^{k_1}}{b_i} + d_i + \max(0, t_{i+1}^{k_1-1} - d_i - t_i^{k_1}) \right). \tag{21}$$

The above equation can be further simplified as $$t_n^{k_1} = \frac{s^{k_1-1}}{b_{l_q}} + \sum_{i=0}^{l_q-1} \left( \frac{s^{k_1-1}}{b_i} \right) + \sum_{i=l_q}^{n-1} \left( \frac{s^{k_1}}{b_i} \right) + t_0^{k_1-1} + \sum_{i=0}^{n-1} (d_i). \tag{22}$$

Similarly, it may be inferred that the time packet $_{k1}$ takes to arrive at the destination link $_n$ is:

$$t_n^{k_2} = \frac{s^{k_2-1}}{b_{l_q+1}} + \sum_{i=0}^{l_q} \left( \frac{s^{k_2-1}}{b_i} \right) + \sum_{i=l_q+1}^{n-1} \left( \frac{s^{k_2}}{b_i} \right) + t_0^{k_2-1} + \sum_{i=0}^{n-1} (d_i) \tag{23}$$

If $s^{k_1}=s^{k_2}$, $s^{k_1-1}=s^{k_2-1}$, comparing the two equations, $$t_n^{k2} - t_n^{k1} = \frac{s^{k2-1}}{b_{l_q+1}} - \frac{s^{k1}}{b_{l_q}} + t_0^{k2} - t_0^{k1}. \quad (24)$$

That is, $$\frac{s^{k2-1}}{b_{l_q+1}} - \frac{s^{k1}}{b_{l_q}} = (t_n^{k2} - t_0^{k2}) - (t_n^{k1} - t_0^{k1}) = \text{delay2} - \text{delay1}. \quad (25)$$

Solving $b_{l_q+1}$, $$b_{l_q+1} = \frac{b_{l_q} \times s^{k2-1}}{s^{k1} + (\text{delay2} - \text{delay1}) \times b_{l_q}}. \quad (26)$$

TABLE 2

Variable Definitions.

| | |
|---|---|
| n links | hop length of the path |
| $d_l$ sec. | latency of link l |
| $d^l$ sec. | sum of latencies up and including link l |
| $b_l$ bits/sec. | bandwidth of link l |
| $s^k$ bits | size of packet k |
| $t^k_l$ sec. | time when packet k fully arrives at link l |
| $q^{kl}$ sec. | amount of time packet k is queued at link l |
| $l_{bn}$ link number | the bottleneck link |

This shows that the bandwidth of a link at which queuing occurs ($b_{l_q+1}$) can be calculated from the sizes of the two packets ($s^{k_1}$, $s^{k_2-1}$), the time variation between packet $k_1$ and $k_2$ (delay2–delay1), and the bandwidth of the previous link ($b_{l_q}$). Note that, although the timer between sender and receiver may be different, it is of no effect to the calculation of the difference.

Having now estimated the link bandwidth results, a kernel density estimator is used to filter the estimation noise. The value with maximum density is selected as the link bandwidth. The system of the invention first defines a kernel function $K_{(t)}$ with the property $$\int_{-\infty}^{+\infty} K(t) \, dt = 1. \quad (27)$$

Then the density at any point $x$ is defined as $$\frac{1}{n} \sum_{i=1}^{n} K\left(\frac{x - x_i}{h}\right), \quad (28)$$

where $h$ is the kernel width, $n$ is the number of points within $h$ of $x$, and $x_i$ is the $i$th point. The kernel function is $$y = \begin{cases} 1 + x & x \leq 0 \\ 1 - x & x > 0 \end{cases}. \quad (29)$$

As may be seen, a larger value of the kernel width gives a more accurate result of the density, but is also computationally expensive. In a preferred embodiment of the present invention, the kernel width is set as the whole range of the bottleneck bandwidth, i.e., $x_{max} - x_{min}$. In that case, the density at any point x can be simplified as $$\sum_{i=1}^{n} |x - x_1|. \quad (30)$$

As discussed above, the system of the present invention focuses both on QoS probing and monitoring and on QoS analysis and prediction to ensure that the appropriate game candidates are found. Having now completed the discussion of the QoS probing and monitoring phase, attention is now turned to the second phase, to wit the QoS analysis and prediction phase.

In order for the CS 260 illustrated in FIG. 12 to select the suitable peers more effectively when a request is received from a Peer, the CS 260 stores various network probe results from prior probes in a network condition database 264. In this way, the CS 260 can return satisfactory results in a timely fashion. Considering the tradeoff between computation complexity and measurement accuracy, off-line data analysis and on-line data predication are iteratively performed in CS 260. To perform the off-line data analysis, the Background Data Analyzer module 262 utilizes feature extraction and data combination. The functionalities of the feature extraction include grouping of the related information of different Peers, obtaining discriminative features which it can characterize the critical path QoS parameters, and extracting useful temporal information from the data. The combination function will combine all the information to obtain the statistical model.

As discussed above, the network probe results that are determined in the QoS probing and monitoring phase include L1, L2, L3, L4 and B1 and are received by the active probing results module 266. L1 and L2 can be measured at the login stage, and L3/L4 and B1/B2 can be determined in the probing stage. After filtering 268 L1 and L2 will be stored together with each Peer connection record in the CS 260. This information will tell whether that Peer is active. However, L3/L4 and B1/B2 are preferably stored in a separate record together with the corresponding XB.NAT.IP and timestamp. With this information the evaluator 270 can analyze these records and other network probe results from the network condition database 264 to derive a more precise estimation from the predictor 272 for the current link. For example, when an XB1 wants to search for the fastest peers from its CS, the CS 260 analyzes its database 264 and selects XB2, which has the best QoS for the link between XB2.NAT.IP and XB1.NAT.IP. Furthermore, the CS 260 will also retrieve records with the best QoS for the link between XB1.NAT.ISP and XB2.NAT.ISP.

Upon receiving the request from the individual Peer, the CS 260 performs the on-line data prediction function. Depending on the parameter needed to be measured and the off-line analysis result, different predictive models 274 can be used by the predictor 272. The possible model candidates include a weighted moving average model, an autoregressive integrated moving average model, an autoregressive fractionally integrated moving average model, etc. After the measurement results are fed back from the Peer, the CS will re-fit the predictive model. Meanwhile, based on time-of-day, network status, and other information, the CS will adjust the predictive model accordingly. The on-line data analysis and off-line data prediction improves the probe efficiency because when a Peer completes its probing, the other Peers located in the same source and destination NAT/ISP domain can use these probing results for candidate pre-selection. The data analysis and prediction function also uses this information to refine the CS's database.

As may now be apparent from the foregoing discussion of the probing algorithm and result analysis provided by the system and method of the present invention, the uProbe tool and its algorithms can measure several QoS metrics, such as end-to-end delay, bottleneck bandwidth, packet loss ratio, simultaneously. Further, asymmetric network conditions for uplink and downlink can be measured separately using an embodiment of the peer-to-peer QoS probing scheme. The RTT of the network has a long range dependent characteristic, and therefore the distribution of the RTT changes slowly. In other words, the RTT variance in a short period is small. The density estimator scheme is used to represent the bottleneck bandwidth measurement result. As such, when the number of probing packet pairs is very small, i.e., equal to 1 or 2, the measurement result is randomly distributed. With the increasing number of probing packet pairs, i.e., equal and larger than 3, the final bottleneck bandwidth value is the measured bandwidth with the highest density. When the number of probing packet pairs grows larger than a threshold, i.e. the value which can tolerate the network congestion level, there is no strong correlation between the probing accuracy and increased probing time.

As will be recognized by those skilled in the art, in addition to the standard NAT behind which a peer can connect to the network, there are some other non-standard NAT types. For example, some NATs just maintain the last connection in its address/port-mapping-table, which in turn makes it impossible to implement one embodiment of the communication processes for the machine behind that NAT. In such a circumstance, an alternate embodiment of the present invention improves the communication efficiency between two Peers that are behind the same NAT by recording the information about the local IP and local port in the login stage. The system then tries to set up the connection between them through the local IP and port.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of probing quality of service parameters in a peer-to-peer network between at least a first peer and a second peer, comprising the steps of:
    generating by the first peer a first and a second probing packet, each probing packet including a first timestamp;
    sending the first probing packet and the second probing packet to the second peer, the first timestamp of each probing packet indicating a time at which that probing packet is sent;
    receiving from the second peer a first acknowledgement packet and a second acknowledgement packet corresponding to the first probing packet and the second probing packet, each of said acknowledgement packets including the first timestamp of the probing packet to which the acknowledgement packet corresponds, a second timestamp indicating a time at which the corresponding probing packet arrived at the second peer, and a third timestamp indicating a time at which the acknowledgement packet was sent by the second peer; and
    calculating quality of service parameters for the network as a function of the first timestamp, the second timestamp, and the third timestamp of both the first acknowledgement packet and the second acknowledgement packet;
    wherein the step of generating the first probing packet and the second probing packet comprises the steps of generating the first probing packet of a first size, generating the second probing packet of a second size, and wherein the first size and the second size are equal;
    wherein the step of calculating quality of service parameters for the network comprises the step of calculating bottleneck bandwidth for a first path from the first peer to the second peer as a function of the first size divided by the difference between the second timestamp of the first acknowledgement packet and the second timestamp of the second acknowledgement packet; and
    wherein the steps of generating, sending, receiving, and calculating bottleneck bandwidth are repeated approximately 20 times, further comprising the step of filtering out pairs of acknowledgement packets that are interlaced with other packets.

2. The method of claim 1, further comprising the step of overcoming time compression and extension of the acknowledgement packets by utilizing a kernel density estimator over a whole range of the bottleneck bandwidth results.

3. The method of claim 1, wherein the step of receiving the first acknowledgement packet and the second acknowledgement packet comprises the step of receiving the first acknowledgement packet having a third size and the second acknowledgement packet having a fourth size, and wherein the third size and the fourth size are equal.

4. The method of claim 1, further comprising the step of recording a fourth timestamp indicating a time when the first acknowledgement packet is received and a fifth timestamp indicating a time when the second acknowledgement packet is received, and wherein the step of calculating quality of service parameters for the network comprises the step of calculating bottleneck bandwidth for a second path from the second peer to the first peer as a function of the third size divided by the difference between the fourth timestamp and the fifth timestamp.

5. The method of claim 1, further comprising the step of recording a fourth timestamp indicating a time when the first acknowledgement packet is received and a fifth timestamp indicating a time when the second acknowledgement packet is received, and wherein the step of calculating quality of service parameters for the network comprises the step of calculating a first end-to-end delay between the first peer to the second peer as a function of the first timestamp of the first acknowledgement packet, the second timestamp of the first acknowledgement packet, the third timestamp of the first acknowledgement packet, and the fourth timestamp.

6. The method of claim 5, wherein the step of calculating quality of service parameters for the network comprises the step of calculating a second end-to-end delay between the first peer to the second peer as a function of the first timestamp of the second acknowledgement packet, the second timestamp of the second acknowledgement packet, the third timestamp of the second acknowledgement packet, and the fifth timestamp.

7. The method of claim 1, further comprising the step of recording a fourth timestamp indicating a time when the first acknowledgement packet is received, and wherein the step of calculating quality of service parameters for the network comprises the step of calculating a first round trip time between the first peer and the second peer as a difference between the first timestamp and the fourth timestamp, less a difference between the third timestamp and the second timestamp, all of the first acknowledgement packet.

8. The method of claim 7, wherein the steps of generating, sending, receiving, and calculating a first round trip time are repeated approximately 20 times, further comprising the step of determining a median of the 20 first round trip times to represent a first measured round trip time.

9. The method of claim 7, further comprising the step of recording a fifth timestamp indicating a time when the second acknowledge packet is received, and wherein the step of calculating quality of service parameters for the network comprises the step of calculating a second round trip time between the first peer and the second peer as a difference between the first timestamp and the fifth timestamp, less a difference between the third timestamp and the second timestamp, all of the second acknowledgement packet.

10. The method of claim 9, wherein the steps of generating, sending, receiving, and calculating a second round trip time are repeated approximately 20 times, further comprising the step of determining a median of the 20 second round trip times to represent a second measured round trip time.

11. The method of claim 1, wherein the step of sending the first probing packet and the second probing packet to the second peer comprises the step of sending the first probing packet and the second probing packet back to back.

12. The method of claim 1, wherein the step of sending the first probing packet and the second probing packet to the second peer comprises the step of sending the first probing packet and the second probing packet as a probing packet pair.

13. The method of claim 1, wherein the step of generating the first probing packet and the second probing packet comprises the step of generating the first probing packet and the second probing packet of a size approximately equal to 200 bytes.

14. The method of claim 1, wherein the step of sending probing packet pairs comprises the step of determining the interval between the probing packet pairs when the access bandwidth is large enough.

15. The method of claim 1 wherein the second peer connects to the network through a network address translator, and wherein the step of generating comprises generating a first UDP-based probing packet and a second UDP-based probing packet.

16. The method of claim 1, wherein the network includes at least one connection server, the connection server having contact information for at least the second peer, the method further comprising the steps of:
  establishing a connection to the connection server;
  requesting peer contact list information from the connection server;
  receiving the peer contact list information; and
  maintaining the connection open to the connection server.

17. The method of claim 16, further comprising the steps of measuring a first latency between the first peer and the connection server, and transmitting information of the first latency to the connection server.

18. The method of claim 17, wherein the first peer connects to the network through a network address translator, the method further comprising the steps of measuring a second latency between the first peer and the network address translator, and transmitting information of the second latency to the connection server.

19. The method of claim 16, further comprising the step of registering a port for quality of service probing with the connection server.

20. The method of claim 16, further comprising the step of transmitting the quality of service parameters to the connection server.

21. The method of claim 1, further comprising the step of receiving a probing packet from a peer, and immediately responding to the probing packet.

22. The method of claim 21, wherein the step of immediately responding to the probing packet comprises the steps of recording a sixth timestamp corresponding to a time of receipt of the probing packet, forming an acknowledgement packet including the sixth timestamp and a seventh timestamp therein, sending the acknowledgement packet to the peer, the seventh timestamp corresponding to a time the acknowledgement packet is sent.

23. The method of claim 21 wherein the network contains at least one connection server, further comprising the step of registering receipt of the probing packet from the peer with the connection server.

24. The method of claim 1, wherein at least one of the step of receiving fails and the step of calculating provides anomaly results, the method further comprising the step of generating a packet train having four packets therein, the four packets including a first large packet having a time to live set to $(1, \ldots, n-1)$ followed by a first small packet followed by a first delay followed by a second large packet having a time to live set to $(2, \ldots, n)$ followed by a second small packet, transmitting the packet train to the second peer, receiving ICMP time-exceeded error messages from intermediate nodes in a path to the second peer, and inferring link characteristics based on differential destination measurements (DDM).

25. The method of claim 24, wherein the first and second large packets are sized to be as large as possible without fragmenting, and wherein the first and second small packets are set to be as small as possible.

26. The method of claim 24, wherein the first and second large packets are sized to be approximately 1500 bytes, and wherein the first and second small packets are sized to be approximately 40 bytes.

27. The method of claim 24, wherein the steps of generating and transmitting the packet train are repeated for each link in a path from the first peer to the second peer, and wherein the step of inferring link characteristics comprises the step of inferring link bandwidth for each link along the path from the first peer to the second peer.

28. A method of establishing a network session with one of a plurality of peers which provides the best quality of service, the network including at least one connection server, comprising the steps of:
  establishing a connection to the connection server;
  requesting peer contact information from the connection server;
  receiving the peer contact information from the connection server, the peer contact information containing contact information for a plurality of peers;
  probing the plurality of peers;

determining quality of service parameters for each of the plurality of peers;

selecting one of the peers which has the best quality of service; and establishing a peering session with the one of the peers; and further comprising the step of receiving a probing request from a peer, and immediately responding to the probing request; and further comprising the step of registering receipt of the probing request from the peer with the connection server;

wherein the step of probing the plurality of peers comprises the steps of:

generating a probing packet pair;

transmitting the probing packet pair to each of the peers in parallel; and recording a first and a second timestamp corresponding to a time when each packet in the probing packet pair were transmitted.

29. A method of establishing a network session with one of a plurality of peers which provides the best quality of service, the network including at least one connection server, comprising the steps of:

establishing a connection to the connection server;

requesting peer contact information from the connection server;

receiving the peer contact information from the connection server, the peer contact information containing contact information for a plurality of peers;

probing the plurality of peers;

determining quality of service parameters for each of the plurality of peers;

selecting one of the peers which has the best quality of service; and establishing a peering session with the one of the peers;

wherein the step of probing the plurality of peers comprises the steps of:

generating a probing packet pair;

transmitting the probing packet pair to each of the peers in parallel; and recording a first and a second timestamp corresponding to a time when each packet in the probing packet pair were transmitted.

30. The method of claim 29, further comprising the step of transmitting the quality of service parameters for each of the plurality of peer to the connection server.

31. The method of claim 29, further comprising the steps of measuring a first latency to the connection server, and transmitting the first latency to the connection server.

32. The method of claim 31, wherein the step of establishing a connection to the connection server comprises the step of establishing a connection to the connection server through a network address translator, further comprising the steps of measuring a second latency to the network address translator, and transmitting the second latency to the connection server.

33. The method of claim 29, further comprising the step of registering a port for quality of service probing with the connection server.

34. The method of claim 29, further comprising the step of communicating to the connection server a desire to be a game server.

35. The method of claim 29, further comprising the step of receiving a probing request from a peer, and immediately responding to the probing request.

36. The method of claim 35, wherein the step of immediately responding to the probing request comprises the steps of recording a first timestamp corresponding to a time of receipt of the probing request, forming an acknowledgement packet including the first timestamp and a second timestamp therein, sending the acknowledgement packet to the peer, the second timestamp corresponding to a time the acknowledgement packet is sent to the peer.

37. The method of claim 29, wherein the step of determining the quality of service parameters comprises the steps of:

receiving a probing acknowledgement pair from at least one of the peers, the probing acknowledgement pair including a third and a fourth timestamp corresponding to a time of receipt of each of the packets in the probing packet pair, and a fifth and a sixth timestamp corresponding to a time of transmission of each of the packets in the probing acknowledgement pair;

recording a seventh and an eighth timestamp corresponding to a time of receipt of each of the packets in the probing acknowledgement pair; and calculating the quality of service parameters as a function of a size of the packets in the probing packet pair and in the probing acknowledgement pair and of the first, second, third, fourth, fifth, sixth, seventh, and eighth timestamps.

38. The method of claim 37, wherein the step of calculating the quality of service parameters as a function of the size of the packets in the probing packet pair and in the probing acknowledgement pair and of the first, second, third, fourth, fifth, sixth, seventh, and eighth timestamps comprises the steps of calculating a forward bottleneck bandwidth as a function of the size of the packets in the probing pair divided by the difference between the third and fourth timestamps, and calculating a reverse bottleneck bandwidth as a function of the size of the packets in the probing acknowledge pair divided by the difference between the seventh and eighth timestamps.

39. The method of claim 38, wherein the step of probing, and calculating the forward bottleneck bandwidth, and calculating the reverse bottleneck bandwidth are repeated a plurality of times, further comprising the step of filtering out probing acknowledgement pairs that are interlaced with other packets.

40. The method of claim 39, further comprising the step of overcoming time compression and extension of the packets in the probing acknowledgement pairs by utilizing a kernel density estimator over a whole range of the bottleneck bandwidth results.

41. The method of claim 37, wherein the step of calculating the quality of service parameters as a function of the size of the packets in the probing packet pair and in the probing acknowledgement pair and of the first, second, third, fourth, fifth, sixth, seventh, and eighth timestamps comprises the steps of calculating a first round trip time (RTT) as a function of a difference between the second and the eighth timestamps less a difference between the fourth and the sixth timestamps.

42. The method of claim 41, wherein the step of probing, calculating the first RTT, and calculating the second RTT are repeated a plurality of times, further comprising the step of determining a median of the plurality of first and second RTTs to represent a measured RTT of the network.

43. The method of claim 29, wherein the step of generating the probing packet pair comprises the step of generating a first UDP-based packet and a second UDP-based packet to form the probing packet pair.

44. The method of claim 29, wherein the step of transmitting probing packet pairs comprises the step of determining the interval between the probing packet pairs utilizing a Poisson distribution to describe the interval between each packet-pair of a certain peer, recognizing that different peers may have different arrival rates.

45. A method of establishing a network session with one of a plurality of peers which provides the best quality of service, the network including at least one connection server, comprising the steps of:
   establishing a connection to the connection server;
   requesting peer contact information from the connection server;
   receiving the peer contact information from the connection server, the peer contact information containing contact information for a plurality of peers;
   probing the plurality of peers;
   determining quality of service parameters for each of the plurality of peers;
   selecting one of the peers which has the best quality of service; and
   establishing a peering session with the one of the peers;
   wherein the step of probing the plurality of peers is unsuccessful for at least one peer, further comprising the step of analyzing hop-by-hop characteristics for a path to the at least one peer for which the step of probing is unsuccessful.

46. The method of claim 45, wherein the step of analyzing hop-by-hop characteristics comprises the steps of generating a UDP-based probing packet train for each link in the path, each probing packet train having a first largest possible non-fragmented packet followed by a first smallest possible packet followed by a first delay followed by a second largest possible non-fragmented packet followed by a second smallest possible packet, transmitting each probing packet train to the at least one peer, and inferring link characteristics for each hop in the path by differential destination measurement (DDM).

47. A computer-readable medium having computer-executable instructions for performing steps comprising:
   generating a first and a second probing packet, each probing packet including a first timestamp;
   sending the first probing packet and the second probing packet to a peer, the first timestamp of each probing packet indicating a time at which that probing packet is sent;
   receiving from the peer a first acknowledgement packet and a second acknowledgement packet corresponding to the first probing packet and the second probing packet, each of said acknowledgement packets including the first timestamp of the probing packet to which the acknowledgement packet corresponds, a second timestamp indicating a time at which the corresponding probing packet arrived at the peer, and a third timestamp indicating a time at which the acknowledgement packet was sent by the peer; and
   calculating quality of service parameters for the network as a function of the first timestamp, the second timestamp, and the third timestamp of both the first acknowledgement packet and the second acknowledgement packet;
   wherein the step of generating the first probing packet and the second probing packet comprises the steps of generating the first probing packet of a first size, generating the second probing packet of a second size, and wherein the first size and the second size are equal;
   wherein the step of calculating quality of service parameters for the network comprises the step of calculating bottleneck bandwidth for a first path to the peer as a function of the first size divided by the difference between the second timestamp of the first acknowledgement packet and the second timestamp of the second acknowledgement packet; and
   wherein the steps of generating, sending, receiving, and calculating bottleneck bandwidth are repeated approximately 20 times, further comprising the step of filtering out pairs of acknowledgement packets that are interlaced with other packets.

48. A computer-readable medium having computer-executable instructions for performing a method of establishing a network session with one of a plurality of peers which provides the best quality of service, the network including at least one connection server, the method comprising the steps of:
   establishing a connection to the connection server;
   requesting peer contact information from the connection server;
   receiving the peer contact information from the connection server, the peer contact information containing contact information for a plurality of peers;
   probing the plurality of peers;
   determining quality of service parameters for each of the plurality of peers;
   selecting one of the peers which has the best quality of service; and
   establishing a peering session with the one of the peers; and
   further comprising the step of receiving a probing request from a peer, and immediately responding to the probing request; and
   further comprising the step of registering receipt of the probing request from the peer with the connection server;
   wherein the step of probing the plurality of peers comprises the steps of:
   generating a probing packet pair;
   transmitting the probing packet pair to each of the peers in parallel; and
   recording a first and a second timestamp corresponding to a time when each packet in the probing packet pair were transmitted.

49. A computer-readable medium having computer-executable instructions for performing a method of establishing a network session with one of a plurality of peers which provides the best quality of service, the network including at least one connection server, the method comprising the steps of:
   establishing a connection to the connection server;
   requesting peer contact information from the connection server;
   receiving the peer contact information from the connection server, the peer contact information containing contact information for a plurality of peers;
   probing the plurality of peers;
   determining quality of service parameters for each of the plurality of peers;
   selecting one of the peers which has the best quality of service; and
   establishing a peering session with the one of the peers;

wherein the step of probing the plurality of peers comprises the steps of:

generating a probing packet pair;

transmitting the probing packet pair to each of the peers in parallel; and recording a first and a second timestamp corresponding to a time when each packet in the probing packet pair were transmitted.

50. A computer-readable medium having computer-executable instructions for performing a method of establishing a network session with one of a plurality of peers which provides the best quality of service, the network including at least one connection server, the method comprising the steps of:

establishing a connection to the connection server;

requesting peer contact information from the connection server;

receiving the peer contact information from the connection server, the peer contact information containing contact information for a plurality of peers;

probing the plurality of peers;

determining quality of service parameters for each of the plurality of peers;

selecting one of the peers which has the best quality of service; and establishing a peering session with the one of the peers;

wherein the step of probing the plurality of peers is unsuccessful for at least one peer, further comprising the step of analyzing hop-by-hop characteristics for a path to the at least one peer for which the step of probing is unsuccessful.

* * * * *